Aug. 17, 1937. W. W. DAVIDSON 2,089,946
MACHINE FOR SEPARATING AND FEEDING BLANKS
Filed Jan. 22, 1934 12 Sheets-Sheet 4
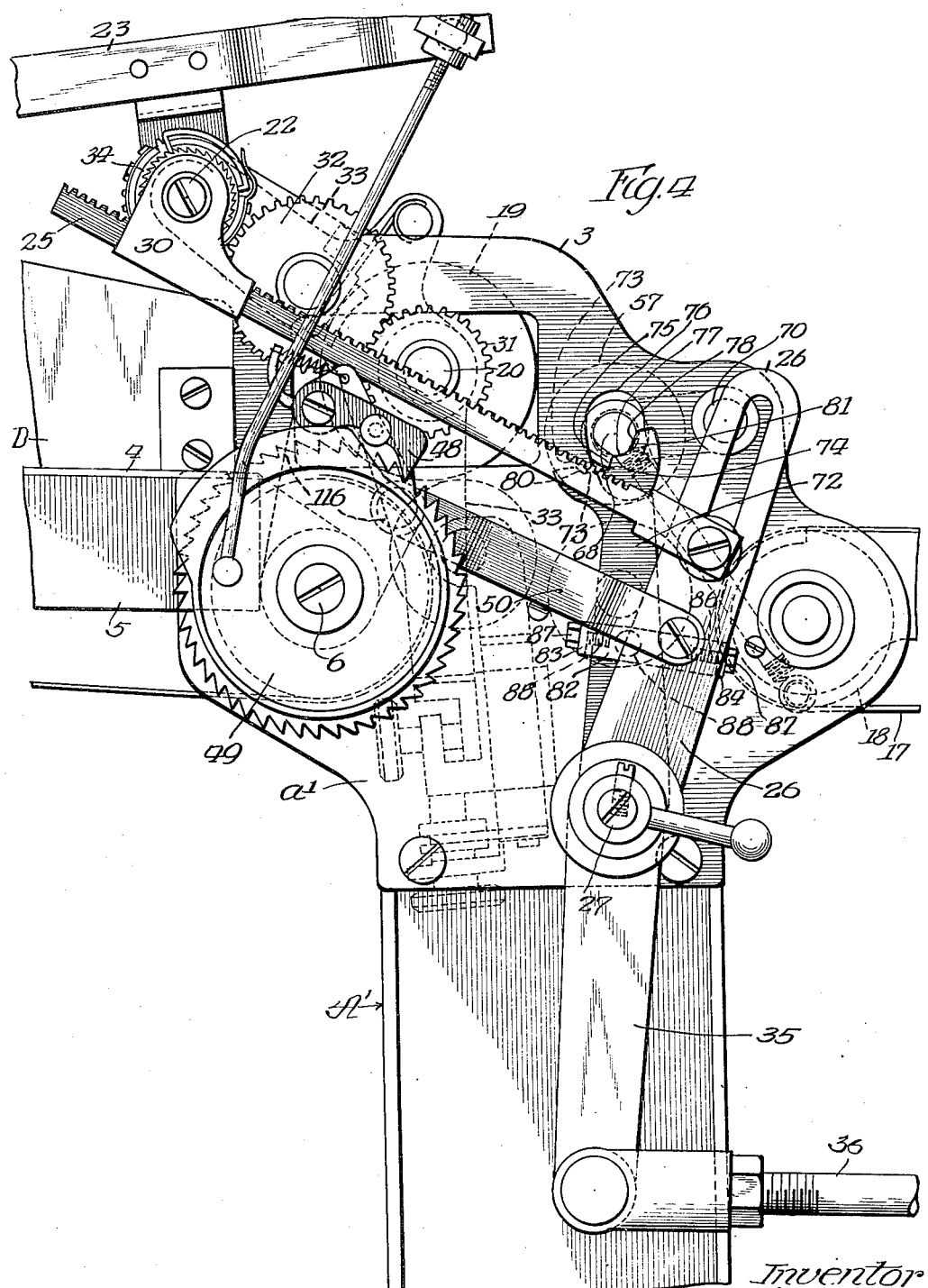

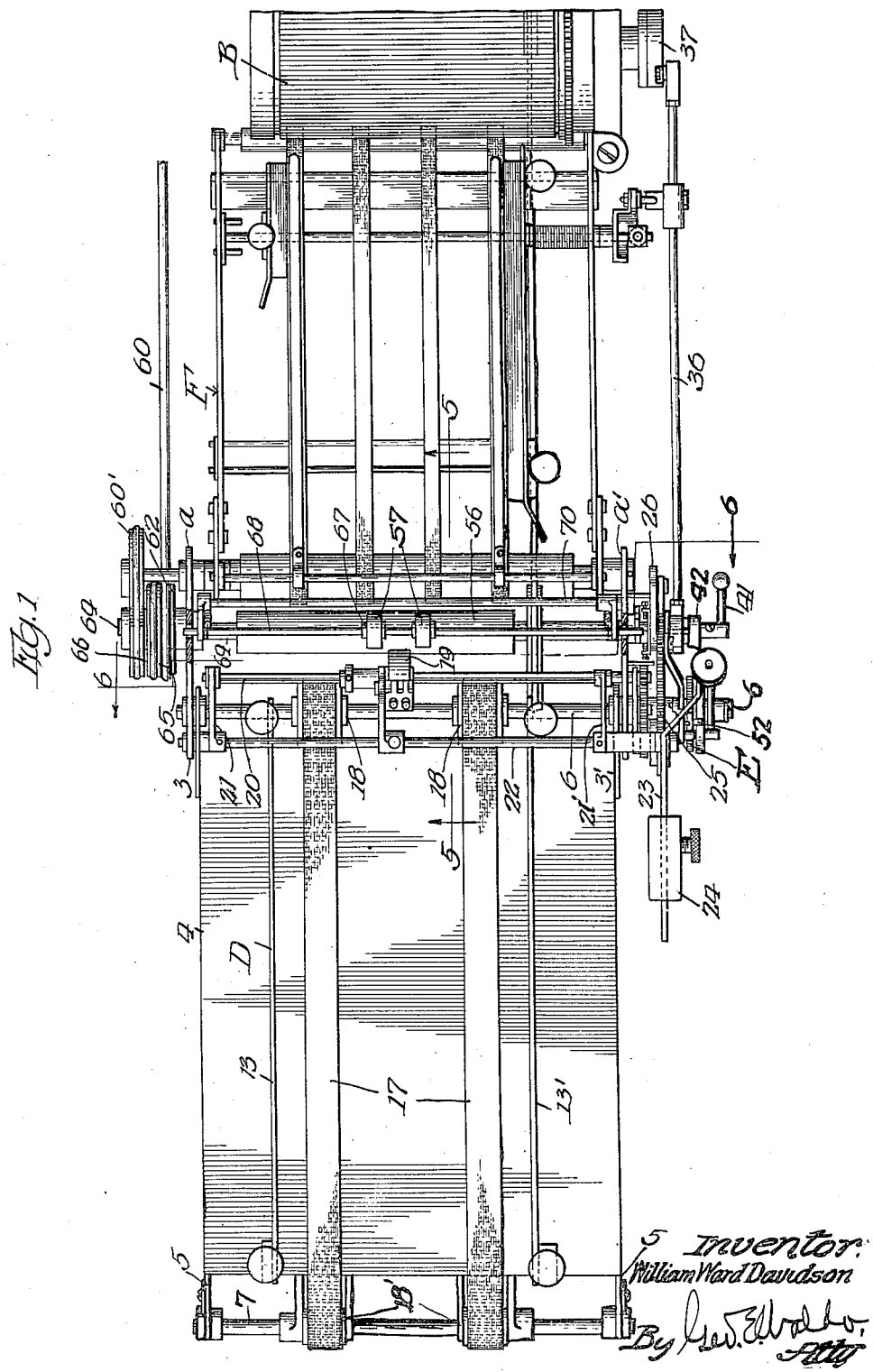

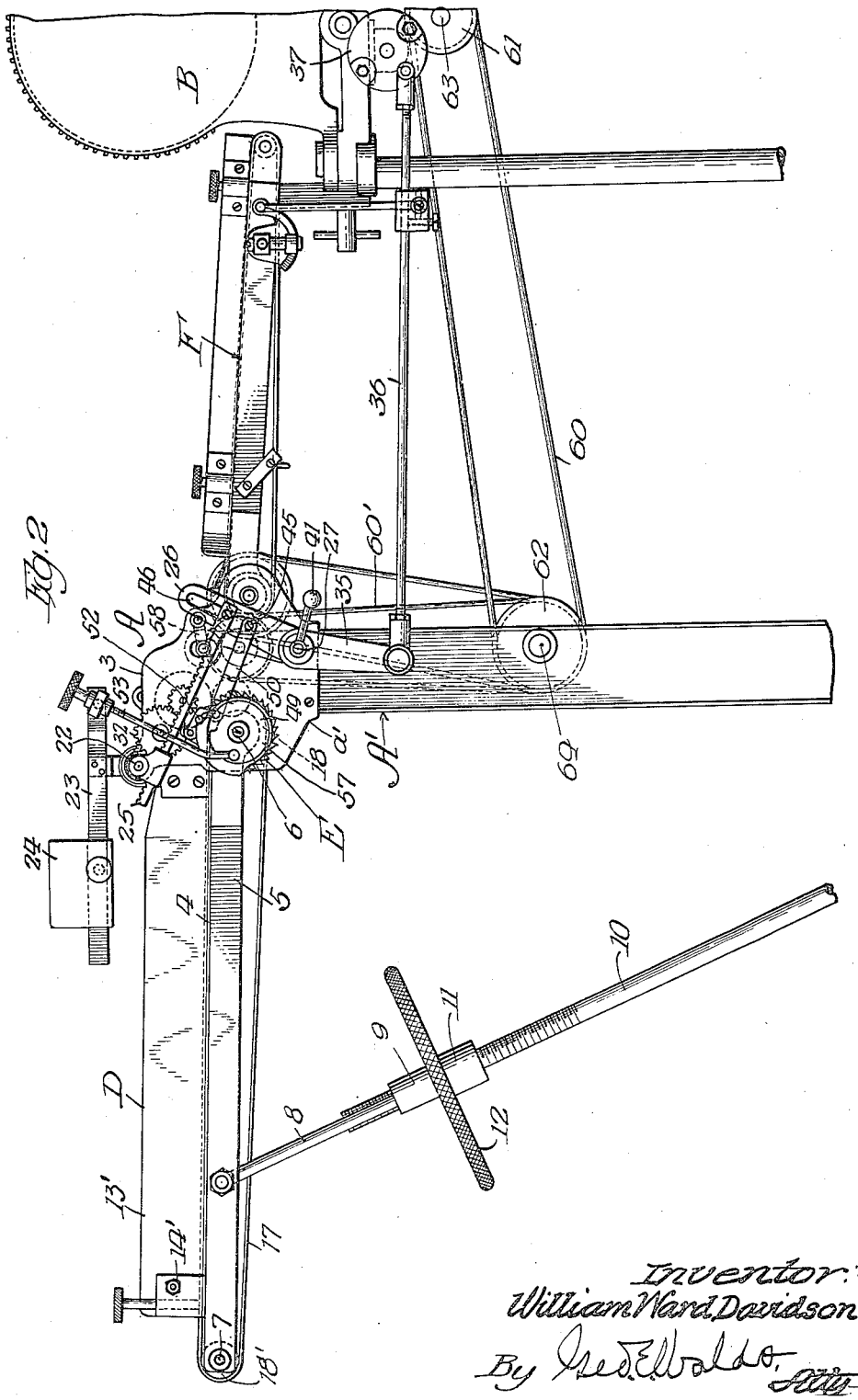

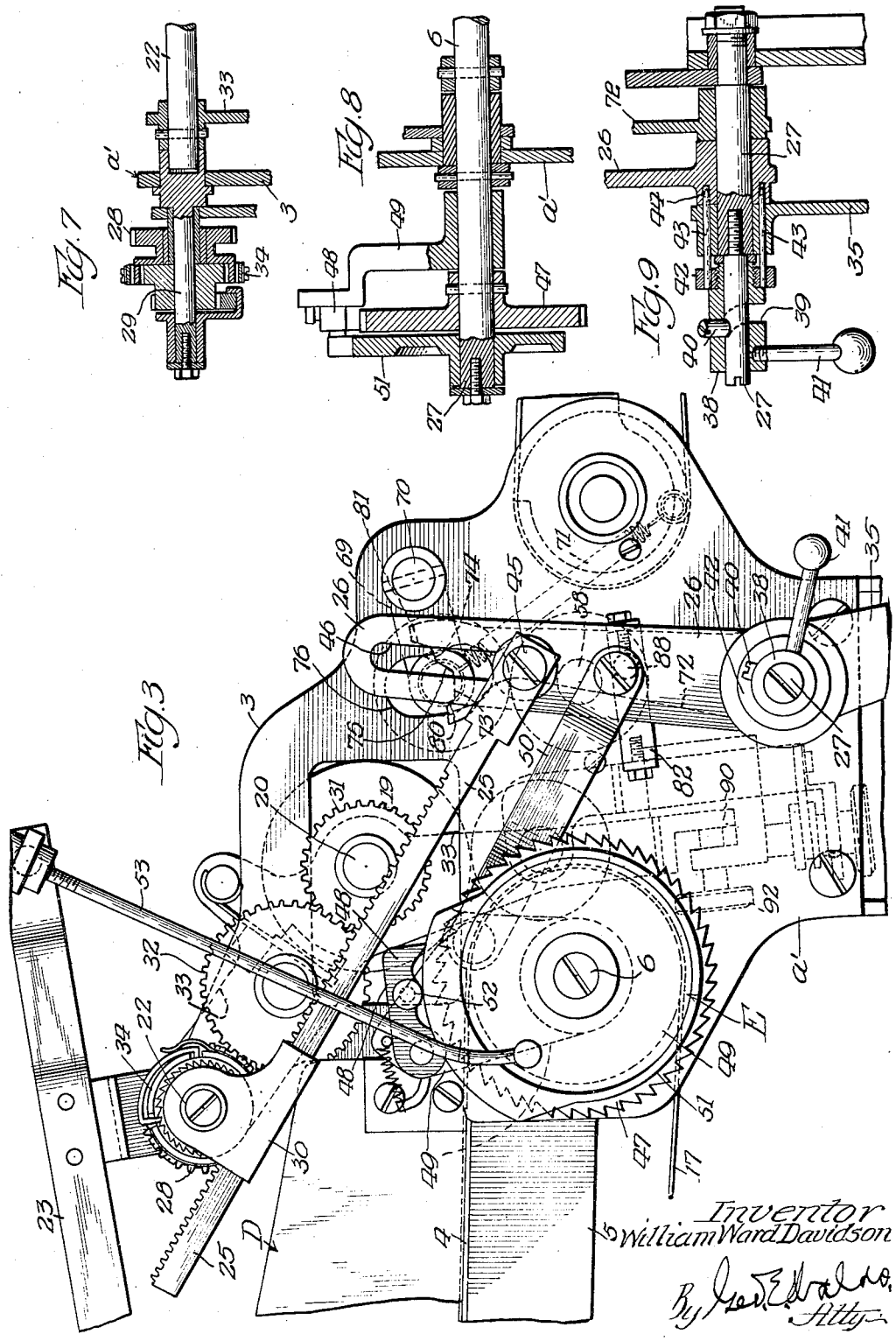

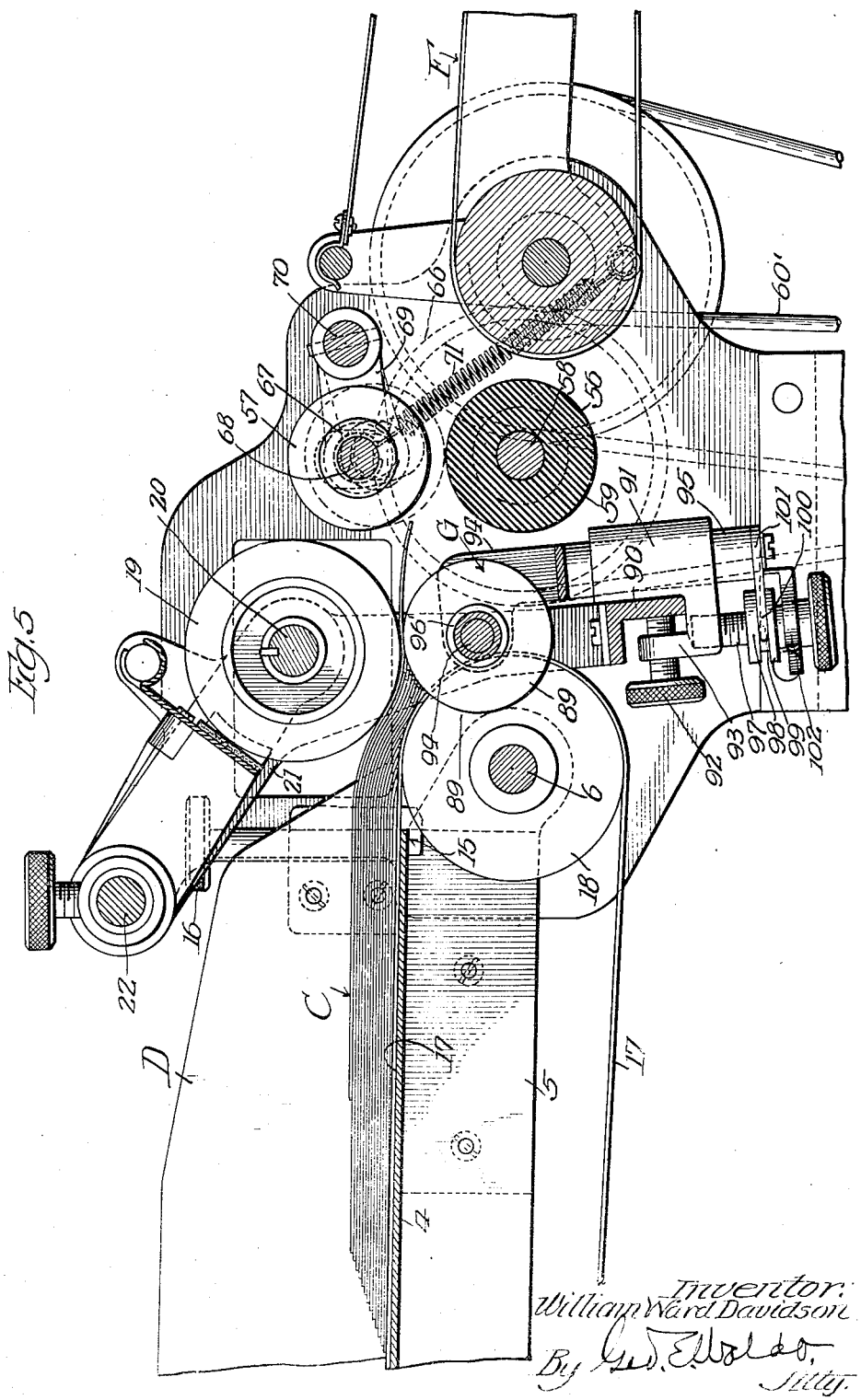

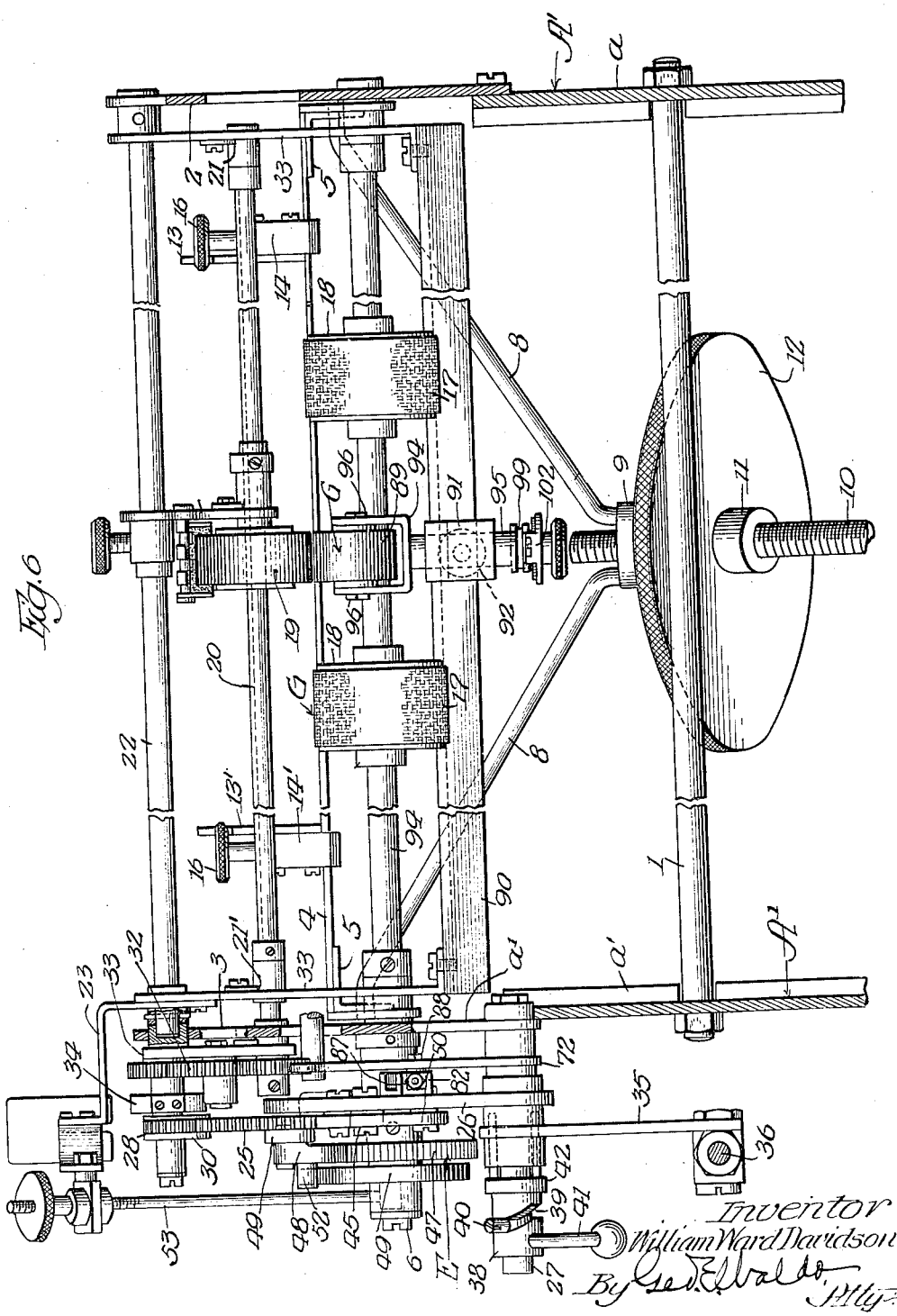

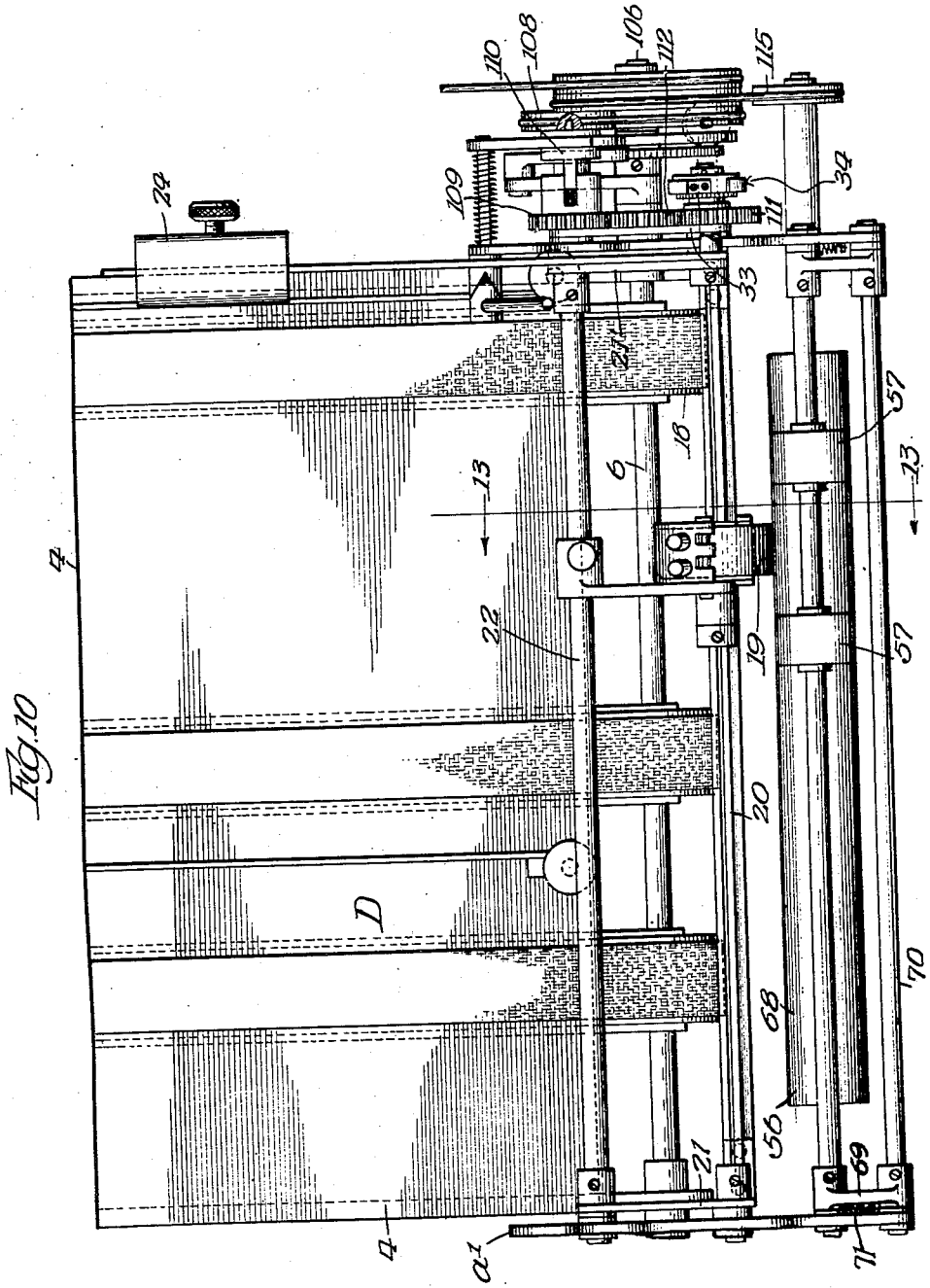

Aug. 17, 1937.   W. W. DAVIDSON   2,089,946
MACHINE FOR SEPARATING AND FEEDING BLANKS
Filed Jan. 22, 1934   12 Sheets-Sheet 8
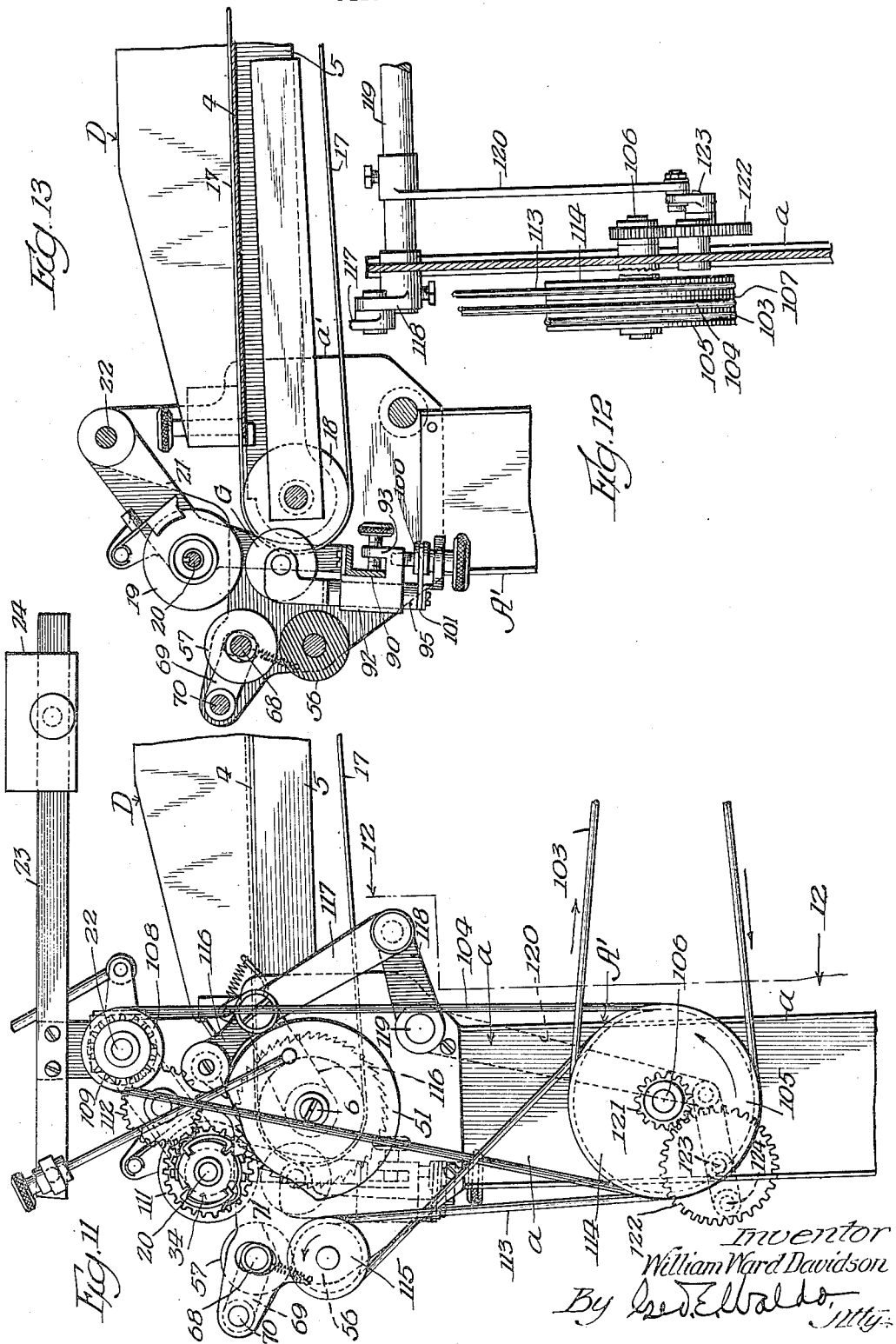

Aug. 17, 1937. W. W. DAVIDSON 2,089,946
MACHINE FOR SEPARATING AND FEEDING BLANKS
Filed Jan. 22, 1934 12 Sheets-Sheet 9
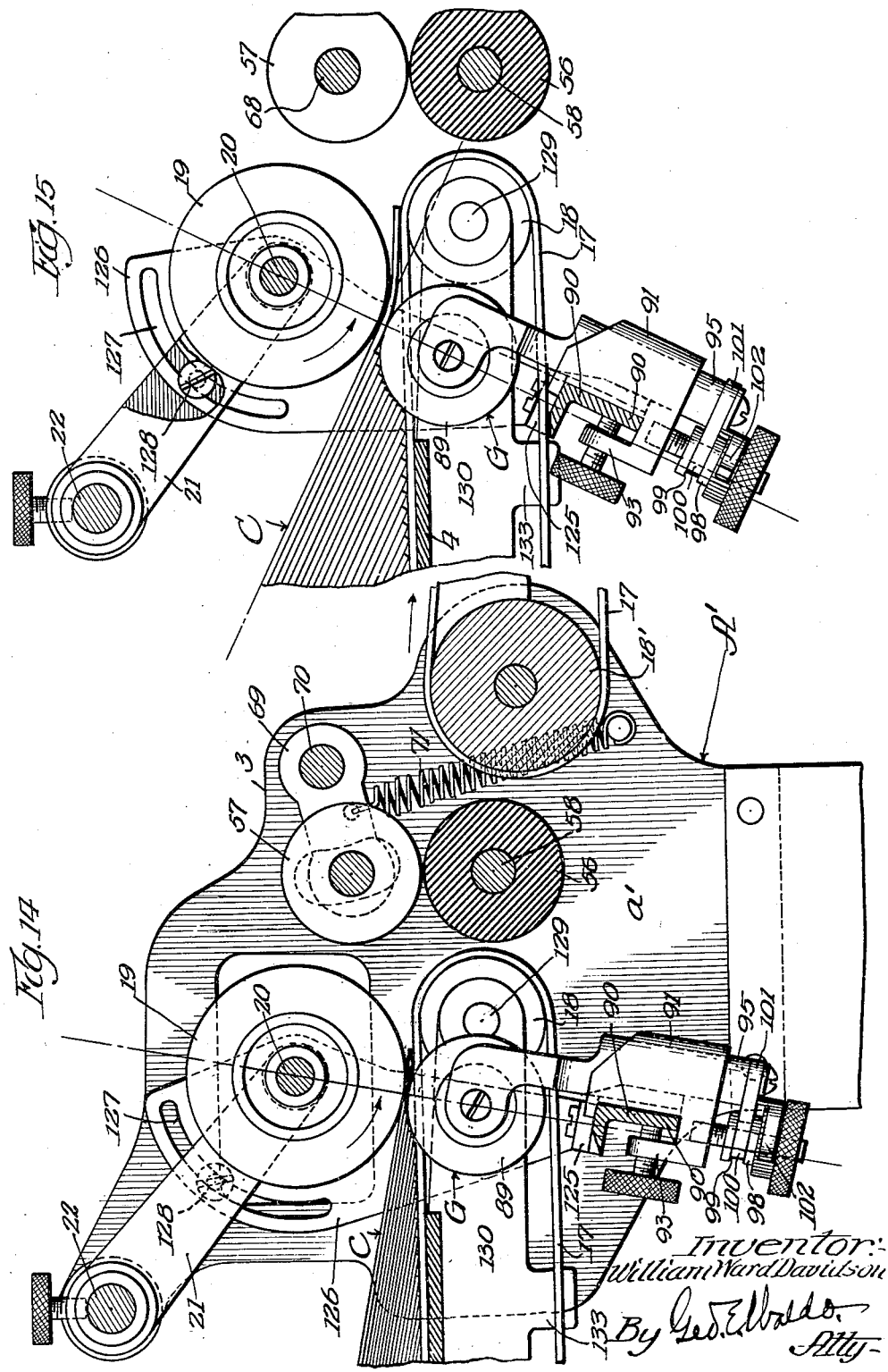

Aug. 17, 1937. W. W. DAVIDSON 2,089,946
MACHINE FOR SEPARATING AND FEEDING BLANKS
Filed Jan. 22, 1934 12 Sheets-Sheet 10
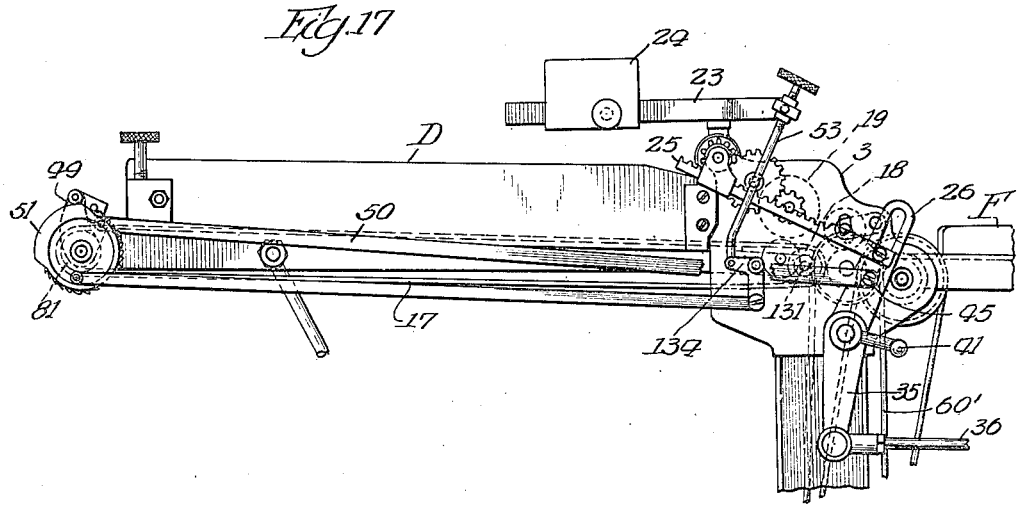
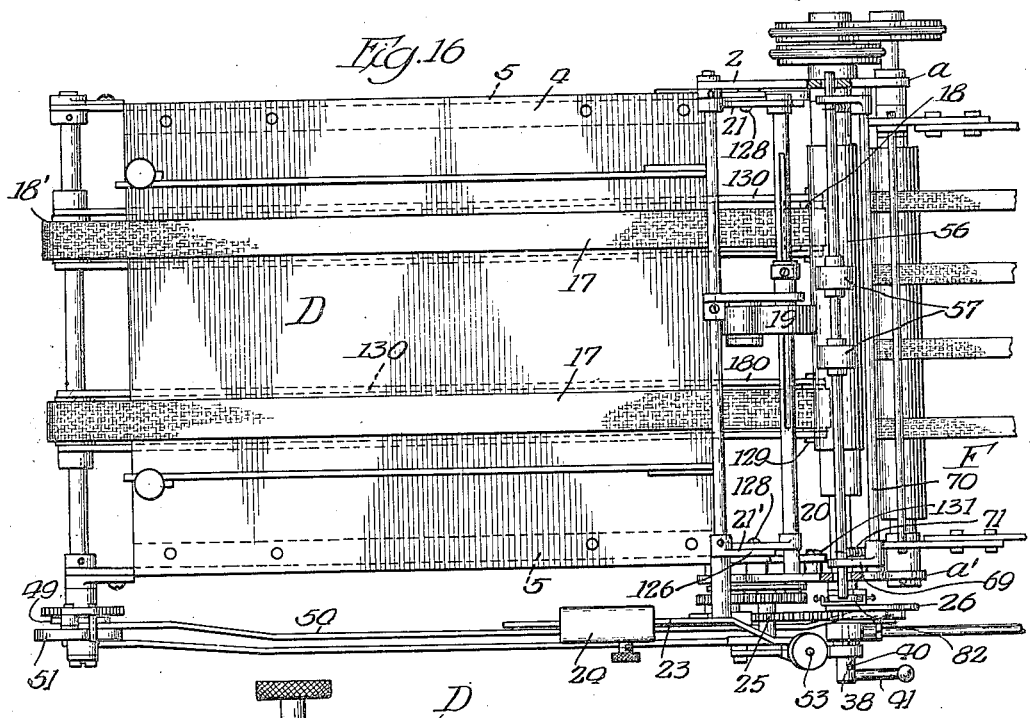
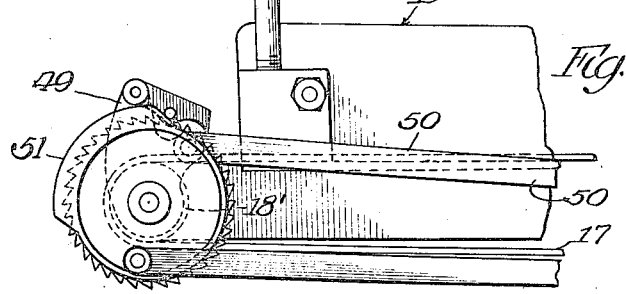

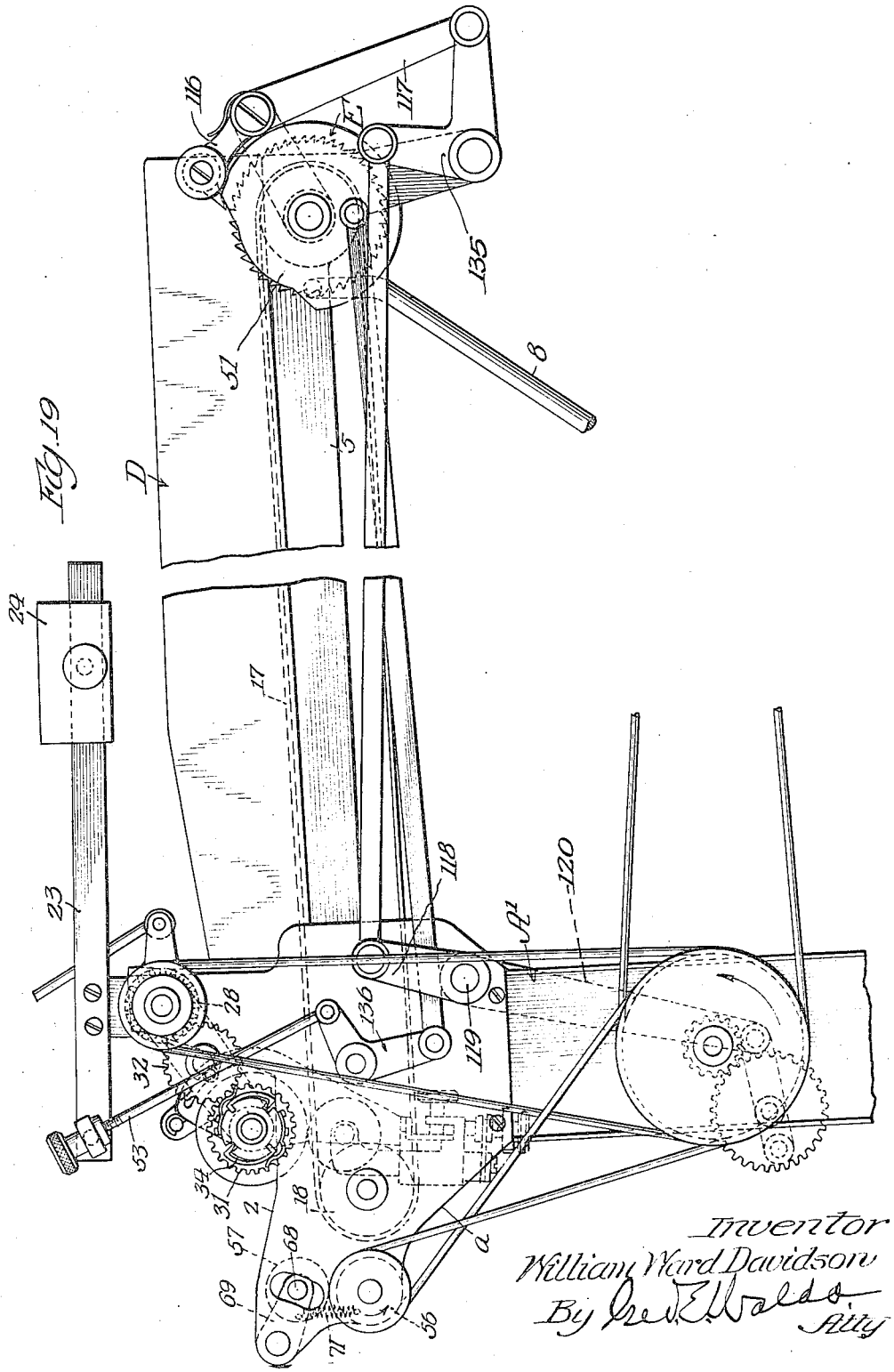

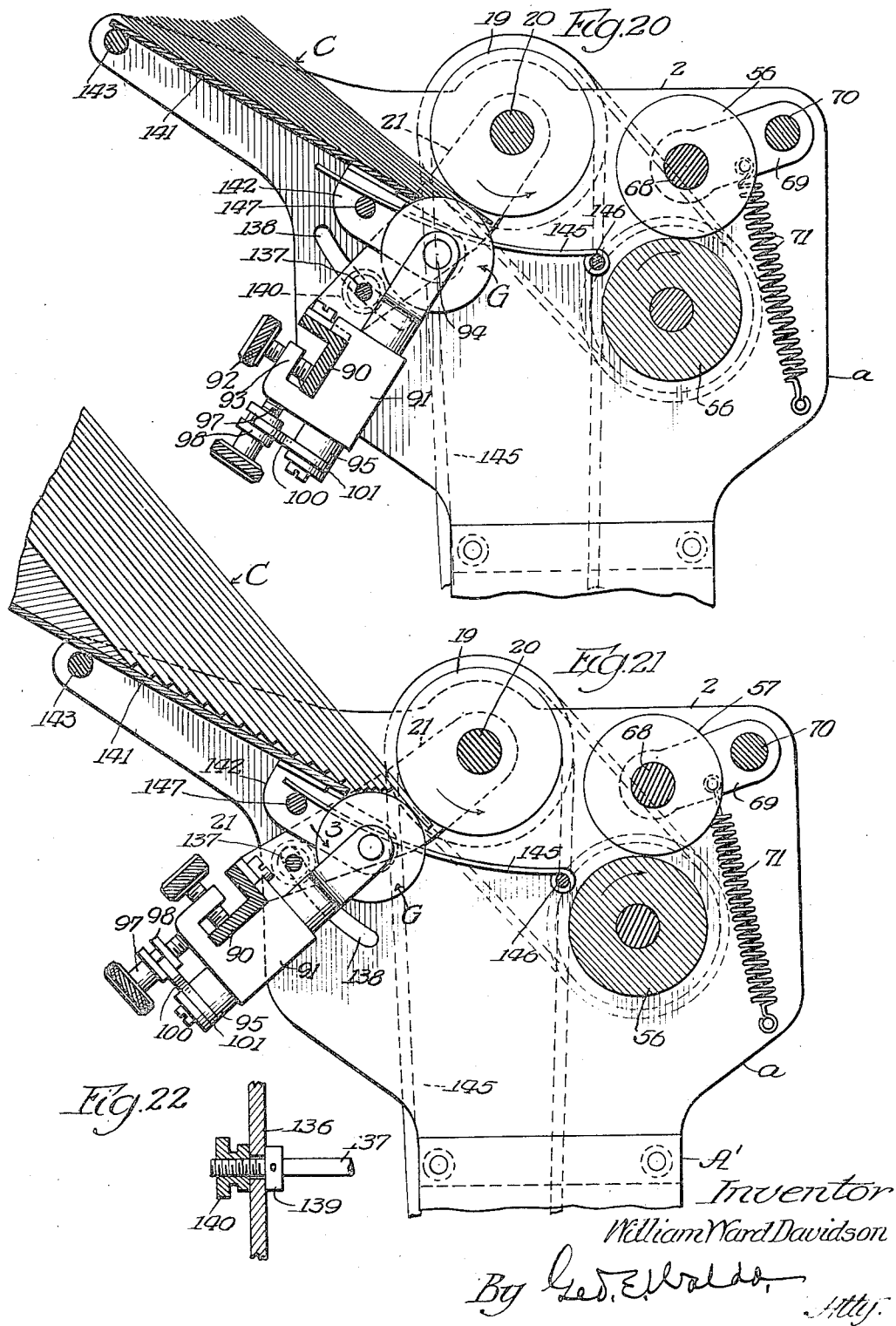

Patented Aug. 17, 1937

2,089,946

UNITED STATES PATENT OFFICE 2,089,946

MACHINE FOR SEPARATING AND FEEDING BLANKS

William Ward Davidson, Evanston, Ill.

Application January 22, 1934, Serial No. 707,681

54 Claims. (Cl. 271—39)

This invention relates to machines for separating and feeding blanks, such as sheets of paper, cards, envelopes, book signatures, pamphlets and the like.

Principal objects of the invention are to provide an improved and simplified machine for the purpose specified.

In which a pack of blanks to be fed is supported in over-lapping relation in a pack receptacle the discharge end of which is pivoted to the frame of the machine so as to be angularly adjustable relatively to the horizontal, and is adapted to be secured in different adjusted positions by suitable means, whereby the blanks may be presented to the blank separating means in position to most effectively separate and feed said blanks.

In which the machine may be charged with additional blanks while running, without interrupting its operation;

Which comprises means controlled by movement of the separator member towards and from the pack supporting surface, for advancing the pack of blanks bodily towards the separator member, and manually operable means for controlling advancement of the pack to co-ordinate advancement of the pack with operation of the blank separator means;

Which comprises a caliper or retard member mounted in association with the separator member so as to be adjustable relative thereto, to vary the space between said separator and caliper or retard members;

Which comprises means for effectually preventing feeding more than a single blank at a time;

In which the separator member is a roll, and the caliper or retard member is mounted in association with said separator roll so as to be movable therewith and adjustable relative thereto both radially and circumferentially to provide for aligning the "angle of repose" of a blank in position to be fed with the space between said separator roll and said caliper or retard member.

In which the means for advancing the pack of blanks in the pack receptacle to the separator member is constructed and arranged for supporting a blank upon which said separator member rests at a given time, so that it will sustain the weight of said separator member and associated parts without sagging, thereby insuring contemplated operation of the separator and caliper and retard members:—

In which the means for advancing the pack of blanks in the pack receptacle comprises a conveyor consisting of rollers rotatably mounted at opposite ends of the pack receptacle, and tapes adjusted thereto, and means applied to the roller at the "loading" end of the pack receptacle for driving said conveyor, the roller at the delivery end of said receptacle consisting of a plurality of spaced sections disposed in position to permit contemplated adjustment of the caliper and retard member relative to the separator member:

To provide a feeder for feeding blanks to duplicating machines particularly designed and adapted for doing relatively small jobs—say up to 500 sheets—which will be simple in construction, effective in operation, strong, durable and relatively inexpensive to manufacture, and which comprises caliper or retard means mounted in association with the separator member, for effectively preventing "double" feeding.

Which may be constructed for intermittent operation, in synchronism with the feed devices of a primary machine, in association with which my improved feeder is mounted for use; or Which may comprise a separator member which is driven continuously in operation and delivers blanks in continuous sequence from the machine.

To effect the various objects thereof, a blank separating and feeding machine embodying my invention and improvements comprises the various features, combinations of features and details of construction hereinafter described and claimed.

In the accompanying drawings in which the invention is fully illustrated:—

Fig. 1 is a top plan view of a blank separating and feeding machine embodying my invention and improvements constructed and arranged for intermittent operation, shown as mounted in association with a timed primary machine.

Figure 2 is an elevation of the left sides of said associated machines, as viewed from the delivery end thereof.

Figures 3 and 4 are, respectively, enlarged elevations of the upper portion of the left side of my improved blank separating and feeding machine, as viewed from the delivery end thereof, with the parts in different operating positions.

Figure 5 is an enlarged, fragmentary, sectional elevation, substantially on the line 5—5 of Fig. 1, showing the position of the separating and feeding devices, as the separator member approaches the end of its feeding stroke.

Figure 6 is an enlarged sectional elevation, substantially on the line 6—6 of Fig. 1.

Figures 7, 8, and 9 are enlarged, fragmentary detail views.

Figure 10 is an enlarged top plan view of a blank separating and feeding machine embodying my invention and improvements, designed for continuous separation.

Figure 11 is an elevation of the right side of said machine, as viewed from its delivery end.

Figure 12 is a fragmentary detail view from the position 12—12 of Fig. 11, the leg of the machine being shown in section.

Figure 13 is a sectional elevation on the line 13—13 of Fig. 10.

Figures 14 and 15 are substantially similar to Fig. 5, illustrating modified means for mounting the caliper and retard member relative to the separator member, and which also shows means for supporting the blanks at the point of separation to prevent sagging thereof under the weight of the separator member.

Figures 16, 17, and 18 are views illustrating certain structural adaptations in applying the pack advancing and control means therefor to feeders embodying the modifications and improvements shown in Figs. 14 and 15.

Figure 19 is a view illustrating corresponding adaptations rendered necessary in applying the modification and improvements shown in Figs. 16 to 18, to a continuous feeder, and Figures 20 and 21 are views corresponding substantially to Figs. 14 and 15, illustrating an adaptation of the invention to a simple form of feeder embodying, broadly, the feature of a caliper and retard member mounted in direct association with the blank separator member and adjustable relative thereto both axially and circumferentially; and Figure 22 is a fragmentary detail view.

Describing the invention with reference to the drawings, I will, in the first instance, describe the machine shown in Figs. 1 to 9, inclusive, designated as a whole A, which is designed and adapted for effecting intermittent separation of the blanks in timed relation to the feeding devices of a primary machine designated as a whole B, which we will assume is a commercial form of printing machine.

In the following description, the designations "right" and "left" have reference to the machine as viewed from its delivery end.

Also, as used herein, "doubles" or "double feeding" designates the feeding of a plurality of blanks, instead of a single blank.

The operative parts of the machine are mounted on a suitable frame designated as a whole A', which comprises right and left-hand frame members a, a', which are rigidly connected in spaced relation by rods, one of which is shown at 1, Fig. 6. For the most part, the operative parts of the machine are mounted directly on plates 2 and 3 forming the upper portion of said side frames a, a'.

Excepting in the case of certain kinds of blanks, as hereinafter particularly described and pointed out, the pack of blanks to be separated and fed, designated as a whole C, see Fig. 5, is supported in flatwise, overlapping position in a suitable receptacle designated as a whole D, comprising a bottom plate 4, which may be made of suitable sheet metal, preferably aluminum, secured to the underside of which are bars 5 pivoted at one end to a shaft 6 rotatably mounted in bearings in the side plates 2 and 3 of the machine frame, a rod or shaft 7, for reasons presently explained, also being rotatably mounted in bearings in the rear ends of said bars 5. As shown, the pack support consisting of the plate 4 and bars 5 is also supported adjacent its "loading" end by rods 8, the upper ends of which are pivoted to the bars 5 of said pack receptacle, as shown, and the lower ends of which are rigidly secured to a block 9 of cast metal in which, as shown, the ends of both of said rods are embedded. Also, to provide for adjusting said pack support pivotally to present the blanks contained therein to the separator roll in proper position to insure effective separation thereof—which for most purposes, we will assume is substantially horizontal—an adjusting screw 10 is pivotally connected to the lower transverse frame rod 1, not shown, the upper end of which extends through a hole formed in the head or block 9, and threaded to which below said head or block is a nut 11, the relation being such that said head or block will rest upon said nut. Thus, by turning the nut 11 in one direction or the other, said pack receptacle may be turned pivotally to raise or lower the outer end thereof, as may be desired. To provide for conveniently and easily turning the nut 11, a relatively large hand grip in the form of a disk 12 is formed on the nut 11, as shown, see Fig. 6.

The pack receptacle D also comprises side plates 13, 13', for guiding the pack of blanks C laterally, said side plates, as shown, being supported in edgewise position on the upper side of the bottom plate 4 so as to be adjustable laterally. As shown, said side plates are supported by clamps consisting of blocks 14 secured to the outer sides thereof adjacent their opposite ends and which, as installed for use, extend downwards below the bottom side of the plate 4 and are provided with grooves 15, see Fig. 5, adapted to hook over opposite ends of said plate and to be clamped thereon by thumb screws 16 which have threaded engagement with holes in said blocks, in position to bear upon said plate outside of the side plates 13, 13', in which they will not obstruct the space between said side plates while, at the same time, making provision for conveniently adjusting said plates to accommodate blanks of different widths and also for presenting blanks to the primary machine B in different positions transversely thereof.

In accordance with my invention, the blanks C in the blank receptacle D rest directly on the upper laps of tapes 17 adjusted to rollers 18, 18', on the shafts 6 and 7, respectively, of which the rollers 18 are secured to the shaft 6 so as to rotate therewith, while the rollers 18' on the shaft 7 may be secured to said shaft or free to turn thereon, the relation being such that the upper laps of said tapes and also the pack of blanks C will rest on the top surface of the bottom plate 4 and will be supported thereby.

In accordance with the invention, see Figs. 3 to 5, inclusive, the means for effecting separation and withdrawal of blanks from the pack receptacle D consists of a separator roll 19 splined to a shaft 20 rotatably mounted in bearings formed in arms 21, 21', pinned or otherwise rigidly secured to a rock-shaft 22 rotatably mounted in bearings in the frame plates 2 and 3.

As shown, said separator roll is positioned above the roller 18 in position to rest upon the front ends of the pack of blanks C in the blank receptacle D, so as to be movable towards and from the bottom plate 4 of the pack receptacle D, whereby said roller 18 will sustain the weight of the overlying parts, including said separator roll 19 and associated parts.

The traction of the separator roll 19 on the blanks C is adapted to be adjusted and controlled by means of a lever 23 secured to the rock-shaft the edge of said disk, said stud preferably being a roller stud. Said cam disk 51 comprises sectors the radial dimension of one of which exceeds that of the ratchet wheel 47, and of the other is less than that of said ratchet wheel, the relation being such that when the stud 52 rides on the reduced sector of said cam disk 51, the pawl 48 will engage the teeth of the ratchet wheel 47, thereby advancing the pack; but, when said stud 52 rides on the full-size sector of said cam disk, the pawl 48 will be disengaged from the teeth of said ratchet wheel and will "idle" and no advancement of the pack will occur.

As shown, also, the cam disk 51 is rotated to effect engagement of the stud 52 with the reduced or full-size sectors of said disk, as the level of the top of the pack of blanks C varies, by a link 53 opposite ends of which are pivotally connected to said cam disk 51 eccentric to its axis, and to the counter-weighted lever 23 secured to the rock-shaft 22 to which the arms 21, 21' are secured and on which the separator roll shaft 20 is rotatably mounted. With the described construction, it is obvious that as blanks are withdrawn from the top of the pack 6 by the separator roll 19, the end of the lever 23 connected to the cam disk 51 will drop, thus turning said disk in a direction to effect contact of the stud 52 with the reduced sector of said disk and thereby permitting engagement of the pawl 48 with the teeth of the ratchet wheel 47 as the rock-arm 26 oscillates, thereby advancing the pack of blanks. It is also obvious that by raising the level of the pack of blanks by advancing said pack or by the insertion of additional blanks, the cam disk 51 will be turned to cause the stud 52 on the pawl 48 to engage the full-size sector of said disk, thus disengaging the pawl 48 from the teeth of the ratchet wheel 47 and preventing engagement of said pawl with the teeth of the ratchet wheel so long as the stud 32 is in engagement with the full-size sector of said disk. Also, to provide for adjusting the cam disk 51 on its axis to vary the peripheral speed and travel of the pack advancing means the operative length of the link 53 is adjustable. To effect such adjustment the end of said link extends through an eye formed in a stud 54 pivoted to the lever 23, and threaded to said link above said stud is a thumb-nut 55 rotation of which in different directions will increase or decrease the operative length of said link, in a familiar manner.

Additional blanks may be inserted into the pack receptacle D without stopping the machine, by introducing them beneath the "following" end of the pack C in said receptacle. In thus supplying blanks to said receptacle, the added blanks will be "fanned" or spread out lengthwise and may be introduced into the receptacle beneath the "following" end of the pack without affecting the operation of the machine. It will be understood that, as introduced into the pack receptacle, the blanks will be spread out lengthwise and will overlap, and that the pack will be comparatively thin.

Mounted in association with the separator roll 19 and at the delivery side thereof, are pull-out rolls 56 and 57. In the preferable construction shown, see Figs. 1, 5, and 6, the lower pull-out roll 56 consists of a shaft 58 rotatably mounted in bearings in the frame plates 2 and 3, having a rubber tread portion 59 secured to said shaft so as to rotate therewith and which, preferably, is substantially continuous from side to side of the operative width of the machine. In operation, said roll 56 is driven continuously by suitable driving connection with a source of power consisting, as shown, see Figs. 1 and 2, of belts 60, 60', of which the belt 60 is adjusted to pulleys 61 and 62 secured, respectively, to shafts 63 and 64 rotatably mounted, respectively, in association with the primary machine B, and in bearings in the side frames a, a' of the feeder A, the shaft 63 having driving connection with an actuated part of said primary machine; and the belt 60' being adjusted to a pulley, not shown, secured to the shaft 64, and a pulley 66 secured to the shaft 58 of the lower pull-out roll 56, the relation being such that the pull-out rolls will be driven at an appreciably higher peripheral speed than the separator roll 19.

As shown, separated blanks delivered to said pull-out rolls are discharged therefrom onto a conveyor-board F mounted between the feeder A and the primary machine B, to which the feeder is applied in use, which may exemplify any desired or approved form of conveyor-board adapted to effect register and synchronism of fed blanks with the feed devices of the primary machine. Or the blanks may be delivered directly to the primary machine by the separator roll 19, if the primary machine embodies some form of pull-out rolls or grip fingers, in which case the pull-out rolls and the conveyor-board may be omitted.

The upper pull-out roll 57 preferably consists of separate, relatively narrow sections, see Fig. 1, said sections having rubber treads secured to metal cores 67 rotatably mounted on a non-rotatable rod 68 secured in bearings in the ends of arms 69, pinned or otherwise secured to a rock-shaft 70 rotatably mounted in bearings in the side plates 2 and 3 of the feeder frame A'.

In operation, rotation is imparted to the sectional upper pull-out roll 57 only by frictional engagement with the driven lower pull-out roll 56 with which it is maintained yieldingly in contact by coil springs 71 which connect the ends of the rod 68 with rigid parts of the machine frame, as shown, see Figs. 5 and 6.

In accordance with the invention, separation of the upper pull-out roll 57 from the lower roll 56 is so timed that the advancing edges of blanks withdrawn from the pack receptacle by the separator roll 19 will pass freely between the same and, having been fed to a position with their advancing edges between said pull-out rolls, and the separator roll having executed substantially its full driven stroke, the upper pull-out roll 57 is released and contact thereof with the lower roll 56 is restored, thus gripping the blanks and feeding them independently of said separator roll and at accelerated speed, the ratchet clutch 34 through which the separator roll 19 is driven, permitting over-spin of the separator roll as the blanks are gripped and accelerated by the pull-out rolls, thus relieving the blanks from stresses which, otherwise, might tend to tear them. By proper timing, also, possibility of pulling the blanks away from the separator roll 19 before its feeding stroke is completed is also avoided. This is very desirable, as otherwise, some part of the feeding stroke of said separator roll might act on the next following blank, thus tending to throw advancement of the blanks out of synchronism with the feed devices of the primary machine. This danger would, of course, be greatest when feeding short blanks.

In accordance with the invention, the means for raising the upper pull-out roll 57 to provide a space between said rolls through which the ad- 22 so as to turn therewith, mounted on which so as to be adjustable endwise thereof is a counterweight 24, adjustment of which towards or from the pivot of said lever will operate, in an obvious manner, to increase or decrease the traction of the separator roll 19 on the blanks C, as the case may be. With the described construction, it is obvious that depressing the end of the lever 23 remote from the separator roll 19 will raise said separator roll above and out of contact with the pack of blanks C, thus providing for varying the traction of said roll on the blanks in the pack receptacle and also providing means for quickly rendering said separator roll inactive and interrupting separation and withdrawal of blanks from the pack receptacle D without stopping the machine, if for any reason desired.

In accordance with the invention, the operative parts of the machine are intermittently actuated to separate and feed blanks, by suitable driving connection with a source of power, which we will assume is a driven member on the primary machine B.

As shown, the separator roll 19 is actuated by means of a rack-bar 25 pivoted at one end to a rock-arm 26, which, in turn, is pivoted on a stud 27 secured in the frame plate a', see Fig. 9, said rack-bar being supported in operative engagement with a pinion 28 rotatably mounted on a stud 29 also secured in the frame member a' by means of a saddle-member 30, as shown, see Figs. 3, 4, and 7, said pinion 28 being connected in train with gears 31 and 32, of which the gear 31 is secured to the separator roll shaft, and the gear 32 is an intermediate idle gear rotatably mounted on a stud secured in an arm 33 secured to the rock-shaft 22 and is provided with a bearing for the separator roll shaft.

In operation, engagement of the rack-bar 25 with the pinion 28—and thus, through the gears 31 and 32, with the separator roll shaft—is effected by means of a ratchet clutch 34.

What I now consider a preferable form of clutch for the purpose, is shown in Fig. 9 of my prior Patent No. 1,627,015, issued May 3, 1927, and described in the specification of said patent, beginning with line 75 of page 7 of said patent, to which reference is here made for a description thereof without repetition. However, said clutch 34 merely exemplifies any desired or approved clutch for the purpose.

In operation, oscillation is imparted to the rack-arm 26 by means as follows, see particularly Figs. 3, 6 and 7:—Pivoted to the stud 27 adjacent the rock-arm 26 is a lever arm 35, which is connected by a rod 36 with a crank pin secured in a crank disk 37 to which rotation is imparted by suitable connection with a driven part of the primary machine B, in synchronism with the feed devices thereof. To provide for quickly and conveniently throwing the feeder A into and out of operation independently of and without stopping the primary machine, the lever arm 35 is adapted to be operatively connected with the rock-arm 26 by means of a clutch.

While my invention contemplates the use of any suitable clutch for the purpose, I have, in Fig. 9 of the drawings, shown what I now consider a preferable form of clutch, which consists of a member 38 provided with a bearing extending lengthwise through the same and mounted to turn on the stud 27 adjacent the hub of the rock-arm 26, said member being provided with a cam groove 39, and secured in said stud 27 is a fixed pin 40 which engages said cam groove, the relation being such that turning movement of the member 38 will impart movement to said clutch member in one direction or the other as the case may be, a handle 41 being secured thereto for turning the same, and mounted in substantially fixed axial position on said clutch member, with capacity for limited turning movement thereon, is a collar 42. As shown, said collar has screw-threaded engagement with a reduced end portion of said clutch member 38 adjacent the hub of the lever arm 35, the pitch of the screw thread being negligible as compared with that of the cam groove 39. Secured in said collar 42 are pins 43 which are slidably fitted to holes formed through the hub of the lever arm 35, said pins being of such length that they will extend through and project beyond the side of said hub remote from the clutch member 38, in position to engage holes formed in the adjacent face of the hub of the rock-arm 26, the extreme outer ends of said pins being tapered, as shown at 44, Fig. 9.

With the described construction, it is obvious that said clutch pins 43 may be engaged with and disengaged from the holes 44 to oscillate the rock-arm 26 or to permit it to remain stationary, by turning the clutch member 38 in one direction or the other, as the case may be.

However, the clutch shown merely exemplifies any desired or approved clutch for the purpose, of which many different forms can readily be devised by skilled mechanics familiar with such mechanisms.

As shown, also, the rack-bar 25 is pivoted to the rock-arm 26 by means of a stud 45, which is adjustable in a slot 46 formed lengthwise in said rock-arm, thus providing for varying the peripheral speed and travel of the separator roll 19.

In accordance with the invention, a pack of blanks C in the pack receptacle D is adapted to be advanced into operating relation to the separator roll 19 by a pawl and ratchet gear applied to the shaft 6 of the pack receptacle, designated as a whole E, comprising a ratchet wheel 47 secured to the end of said shaft which projects through its bearing in the side member a' of the machine frame A', and a pawl 48 pivotally mounted on a pawl-carrying member 49 mounted to turn on the shaft 6 adjacent said ratchet wheel.

In operation, oscillation is adapted to be imparted to the pawl-carrying member 49 by a link 50, opposite ends of which are pivotally connected to studs secured in the rock-arm 26 and in said pawl-carrying member 49, respectively, the relation being such that actuation of said pawl and ratchet gear by oscillation of the rock-arm 26, will operate to advance the pack of blanks C towards the separator roll 19, when the pawl 48 is free to engage the teeth of said ratchet wheel 47.

In accordance with the present invention, however, means are provided for preventing engagement of the ratchet pawl 48 with the teeth of the ratchet wheel 47 when the separator member 19 attains or is higher than a predetermined level relative to the pack supporting surface of the pack receptacle D—thereby interrupting advancement of said pack until the top thereof is below such predetermined level, as blanks are withdrawn in operation.

As shown, the means for thus rendering said ratchet gear inactive is as follows—Mounted to turn on the shaft 6 in close proximity to the ratchet wheel 47 is a cam disk 51 and mounted on the pawl 48 is a stud 52 which projects over vancing edges of blanks fed by the separator roll 19 may enter, is as follows, see Figs. 3 and 4: Pivoted on the stud 27 inside of and adjacent the rock-arm 26 is an arm 72 provided on its free end with flat surfaces 73 and 74 positioned laterally relative to each other and arranged at different distances from the axis of the pivot stud 27, said flat surfaces being connected by an inclined surface 75, as shown. The end of the rod 68 proximate the rock-arm 26 projects through a hole 76 in the frame plate 3, said hole being shaped and proportioned to permit contemplated movement of the rod 68 and the pull-out roll 57 mounted thereon, in operation.

The end of said rod 68 which extends through the hole 76 projects over the free end of the arm 72 and is provided with a flat surface 77, which is substantially parallel with the surfaces 73 and 74, and with a surface 78 which is a cam surface and extends substantially parallel with the cam surface 75 on said arm. At the remote ends of the surfaces 73 and 74, are shoulders 80 and 81, which limit pivotal movement of the arm 72 and prevent disengagement of the rod 68 therefrom in operation.

In accordance with the invention, the rock-arm 26 is operatively connected with the arm 72 in such manner that oscillation of said rock-arm will impart differential oscillation to the arm 72 in the same direction, the relation being such that, as said rock-arm 26 describes the latter portion of its "idling" stroke, the arm 72 will be turned pivotally to cause the cam surface 78 on the rod 68 to ride up the cam surface 75 on the end of said lever arm 72 and to effect engagement of the surface 77 on said rod with the raised surface 74 on the end of said arm 72—raising the upper pull-out roll 57 out of contact with the driven roll 56 and thereby permitting the advancing edge of fed blanks to pass freely between said pull-out rolls. The relation is such also that after the rock-arm 26 has begun its feeding stroke and the advancing edge of a fed blank has passed through the space between the pull-out rolls, said arm 72 will be turned pivotally in a direction to effect disengagement of the surface 77 on the rod 68 from the surface 74 on the lever arm 72 and to move said surface into position over the surface 75 on the end of said arm, in which position the springs 71 applied to the rod 68, will again draw the upper feed roll 57 downwards into contact with the lower feed roll 56, so as to grip a blank which has entered between said pull-out rolls.

As shown, the means for connecting the rock-arm 26 with the arm 72 consists of what may be described generally as a yoke comprising an intermediate portion 82 rigidly secured to the rock-arm 26, formed on which are spaced lugs 83, 84, threaded to holes in which, respectively, are screw-studs 85, 86, which are adapted to be secured in desired adjusted positions by lock nuts 87, in a usual manner, and secured to the arm 72 mounted adjacent the rock-arm 26, in line with the screw-studs 85, 86, is a stud 88. With the described construction, it is obvious that by properly adjusting the positions of the screw-studs 85, 86, the pull-out rolls 56, 57, may be separated and again brought together at almost any desired position in their operating cycle.

A particular advantage of the intermittent feeder of my present application resides in the fact that, due to the means employed for intermittently actuating and separating the pull-out rolls 56 and 57, it is possible to greatly simplify the means for actuating the ratchet gear for advancing the pack of blanks C in the pack receptacle D into operative relation to the separator roll 19, which, in the intermittent feeder of the present application, consists merely of the link 50 which connects the rock-arm 26 directly with the pawl-carrying member 49, eccentrically to the pivotal axes thereof, respectively.

To effect the object of the invention as it relates to insuring feeding of the blanks one at a time to the primary machine B, the machine comprises a caliper device designated as a whole G, mounted in association with the separator roll 19, comprising a caliper member 89, supporting means therefor, means for adjusting said caliper member towards and from the separator roll with a very fine micrometer adjustment and, also, transversely of the machine, and means for locking said caliper member in adjusted positions.

The caliper member 89 preferably consists of a cylindrical tread portion made of relatively hard rubber, secured to a metal core or bushing provided with a bearing for mounting said caliper member, said caliper member being ground perfectly true, as near as may be, with the bore in said core or bushing. For reasons presently apparent, the axial dimension of the core or bushing of said caliper member is slightly greater than that of the tread portion thereof, and projects slightly at both sides thereof.

Said caliper member 89 is mounted on the machine frame by means as follows: Secured to the lower ends of the arms 21, 21', in which the separator roll shaft 20 is rotatably mounted, and which are extended downwards a considerable distance below the separator roll 19, is a bar 90, which, to insure adequate strength and rigidity, is an angle bar. Mounted on said bar so as to be adjustable thereon transversely of the machine is a block 91 adapted to be secured to said bar by suitable means, as a set-screw 92 which has threaded engagement with a hole in an angular bracket 93 formed on said block 91, in position to bear against the side of the bar 90 to draw the proximate side of the block 91—which is flat—into strong frictional engagement with said bar.

In the preferable construction shown, the caliper member 89 is mounted in a yoke 94 formed at the upper end of a shank 95 which is slidably fitted to a bearing formed lengthwise through the block 91. Said caliper member 89 does not rotate in operation and is adapted to be secured in different adjusted positions by means of a bolt 96 fitted to a bearing formed in the core or bushing of said caliper member and by means of which the sides of the yoke 94 may be drawn into frictional engagement with the ends of said core or bushing to hold the same in adjusted positions.

The caliper member 89 is adapted to be adjusted towards and from the separator roll 19 to provide a space between said separator roll and caliper member proportioned to permit the passage of a single blank between said separator roll and caliper member, while preventing the passage of more than one blank at a time.

In the preferable construction shown, the means for adjusting said caliper member towards and from the saparator roll consists of a micrometer screw 97 which has threaded engagement with a hole in the supporting block 91 and secured in fixed position to which, so as to rotate therewith, is a collar 98 provided with an annular groove 99, which is engaged by a yoke 100 formed on a plate 101 secured to the lower end of the shank 95 of the caliper support.

As shown, the adjusting screw 97 is a thumb-screw and is adapted to be held in different adjusted positions by a usual form of locking device indicated at 102.

Within the scope and contemplation of the invention, my improved blank separating and feeding machine may readily be adapted for continuous operation—the blanks being delivered from the feeder A to the primary machine B, as a folding machine, in continuous sequence or series without regard to timing or synchronism with relation to the operation of said primary machine.

Such adaptation is shown in Figs. 10 to 13, inclusive, of the drawings, in which, as heretofore, we will assume that said primary machine, not shown, is a commercial form of printing machine.

Excepting as hereinafter particularly described and pointed out, the construction and operation of the "continuous" feeder shown in Figs. 10 to 13, is in all essential respects substantially identical with corresponding features of the "intermittent" feeder shown in Figs. 1 to 9 of the drawings, and will readily be understood from the foregoing description by mechanics familiar with the construction and operation of such devices, similar parts being designated by the same reference characters in both embodiments of the invention.

Features in which the "continuous" machine differs from the "intermittent" machine are:

1. The rack-bar 25 and the means for supporting and actuating the same, including the saddle member 30, the stud 27, and all parts mounted thereon, including the rock-arm 26, the lever arm 35, the clutch for operatively connecting said rock-arm to said actuated lever arm, the connecting rod 36, and the pivoted lever arm 72 for raising the upper pull-out roll 57 from contact with the lower roll 56, and the link 50 connecting the rock-arm 26 with the pawl carrying member 49, are entirely dispensed with.

2. In operation, see particularly Figs. 10, 11, 12, and 13, the separator roll 19 is driven continuously by driving connection with a source of power, which we will assume is the primary machine, by means of belts, 103, 104, of which the belt 103 is adjusted to a driven pulley, not shown, on said primary machine, and a pulley 105 secured to a stub-shaft 106 rotatably mounted in a bearing in the side frame a of the feeder, as shown; and the belt 104 is adjusted to pulleys 107, 108, of which the pulley 107 is secured to the stub-shaft 106 and the pulley 108 is rotatably mounted on an extension of the rock-shaft 22 and is adapted for engagement with and disengagement from the hub of a pinion 109 by means of a clutch 110, which may exemplify any desired or approved form of clutch for the purpose, and which readily can be supplied by skilled mechanics, and need not, therefore, be described in detail. The pinion 109 is connected in train with gears 111 and 112, of which the gear 111 is operatively connected with the separator roll shaft 20 by a ratchet-clutch in all respects similar to the ratchet-clutch 34, operating to rotate said separator roll shaft to withdraw blanks from the pack receptacle D and to deliver them to the pull-out rolls 56 and 57—which are driven at relatively high peripheral speed as compared with the separator roll—and which permits over-spin of the separator roll by the accelerated blanks, and the gear 112 is rotatably mounted on a stud secured in an arm 33 secured to the rock-shaft 22 and which is provided with a bearing for the separator roll shaft 20.

3. In the "continuous" machine, also, see Fig. 11, the lower pull-out roll 56 is driven continuously in operation by means of a belt 113 adjusted to pulleys 114 and 115, secured, respectively, to the stub-shaft 106 and to the shaft of the lower pull-out roll 56. As in the "intermittent" feeder, the upper pull-out roll 57 is rotatably mounted on the non-rotatable rod 68 secured in bearings in the ends of arms 69, pinned or otherwise secured to the rock-shaft 70. In operation, said upper pull-out roll is driven continuously by contact with the driven lower roll 56, with which it is maintained yielding in contact by the springs 71 which connect the ends of the arms 69, with a rigid part of the machine frame—thus permitting said upper roll to be raised out of contact with the lower roll, if for any reason desired.

4. In the "continuous" machine, also, the means for imparting oscillation to the pawl 48 forming part of the ratchet gear for advancing the pack of blanks C into operative relation with the separator roll 19, is as follows: Said pawl is pivoted to an arm 116 mounted to turn on the shaft 6, said arm being also connected by a link 117 with an arm 118 secured to a rock-shaft 119, to which oscillation is imparted in operation through a lever 120 secured thereto, the outer end of which is operatively connected with the stub-shaft 106 by means of a pinion 121 secured to said stub-shaft, which meshes with a gear 122 rotatably mounted on a stud 123 secured in the side frame a, a crank pin 124 secured in which is connected to the lower end of the lever 120 secured to the rock-shaft 119 by a link, as shown.

In feeding blanks which are not readily pliable—as relatively thick and stiff cards, pamphlets and book signatures of any considerable thickness, and blanks which may be described as "puffy", as envelopes which contain enclosures or air—difficulty is sometimes experienced in feeding such blanks, due to the pressure of the separator roll on the advancing ends of the blanks, which it is found, operates to spring the "following" ends of the blanks upwards away from underlying blanks in the pack receptacle, so that the "leading" ends of the blanks, as they are fed to the separator roll or member, instead of being in line with the space between the separator roll and the opposed caliper and retard member, are directed against the surface of the relatively fixed caliper or retard member at such an angle that the traction of the separator roll will be insufficient to overcome the retarding action produced by contact of the "leading" ends of the blanks with the stationary caliper and retard member, or, in other cases, the traction of the separator roll may operate to buckle the blanks and thus "jam" the feeder.

This operating limitation is aggravated by the fact that as shown in the forms of the feeder illustrated in Figs. 1 to 13, heretofore described, the caliper member 89 is mounted in fixed position relative to the separator roll 19, and is bodily movable with the same, and by the further fact that, preferably, said caliper member has a rubber tread into which the "leading" ends of blanks will "dig."

In practice, I have effectively overcome this objectionable limitation by mounting said caliper and retard member so that it will be bodily adjustable circumferentially of the separator roll as well as radially, whereby said caliper and retard member may be adjusted relative to the separator roll to bring the space between said separator roll and caliper member into substantial alignment with what may be described as the "angle of repose" of the uppermost blank in the pack receptacle.

"Foremost" or "uppermost" as used in this connection, designates the blank with which the separator roll contacts in operation, whether it lays flatwise in the pack receptacle or is sprung upwards at an angle to the bottom thereof, as heretofore explained.

This modification is shown in Figs. 14 and 15 of the drawings, the devices shown in which are substantially identical, structurally, the only difference between them being that in Fig. 14, the "angle of repose" of the blanks is much less than in Fig. 15. One description will, therefore, apply equally to both, and the following description is accordingly in the singular.

Also, excepting as hereinafter particularly described and pointed out, the devices shown in said Figs. 14 and 15 are substantially identical with corresponding parts shown in Figs. 1 to 13, are designated by the same reference characters, and will readily be understood from the previous description, without repetition.

To effect the object of the invention as it relates to the feeding of blanks of the character specified, the bar 90, on which the caliper and retard member 89 and the adjusting means therefor are mounted, instead of being secured directly to the lower end of the rock-arms 21, 21', in which the separator roll shaft 20 is rotatably mounted, as shown in Figs. 1 to 13, is secured to lugs 125 on the lower ends of arms formed on plates 126 which are pivotally mounted on the separator roll shaft and formed in which concentric with the axis of rotation of the separator roll are segmental circular slots 127 by means of which said plates are adapted to be secured in adjusted positions to the arms 21, 21' by clamping screws 128, which extend through the slots 127 and have screw-threaded engagement with holes in said arms, the heads of said screws extending over the outer sides of said plates at the edges of said slots. As shown, the slots extend through arcs of approximately 90 degrees, but this relation may be varied as desired.

Due to the close proximity of the caliper member 89 to the conveyor roller 18, on the shaft of which the pack receptacle is pivoted and to which the conveyor tapes 17 are adjusted, instead of being continuous, as in the feeders shown in Figs. 1 to 13, consists of spaced sections mounted on pins 129 secured in the depending flanges of channels 130 secured to the underside of the bottom plate 4 of the pack receptacle, the webs of said channels being cut away to receive said sectional rollers. As shown, also, the delivery end of the pack receptacle D is pivoted to studs 131 secured in the plates 2 and 3 of the frame A', by means of bearings formed in the depending flanges of the angle bars 5 secured to the under side of the bottom 4 of the pack receptacle, at or adjacent to the lateral edges thereof. As shown, also the conveyor tapes 17 are confined in operative adjustment on the rollers 18, 18', by suitable guides consisting, as shown, see Figs. 14 and 15, of depending lugs 133 on the flanges of the channels 130, positioned to embrace opposite edges of said tapes with only operating clearance.

With the construction described, it is obvious that an unobstructed space will be provided beneath the discharge end of the conveyor mounted on the blank receptacle D, which will permit adjustment of the bar 90 through a considerable angle beneath the proximate end of the pack receptacle.

As also shown in said Figs. 14 and 15, the machine therein illustrated embodies a further improvement, which consists of means for supporting the pack of blanks to prevent sagging of said blanks under the weight of the separator member and associated parts, which might otherwise bend the "leading" ends of the blanks downwards out of alignment with the space between the separator member and the caliper and retard member.

What I now consider preferable means for this purpose, consists in mounting the sectional conveyor roller 18 in such position that its axis of rotation will be at the discharge side of a transverse, vertical plane through the axis of rotation of the separator roll. With this relation, it is obvious that the upper laps of the conveyor tapes 17 will extend beneath and both ways from the point of contact of the separator roll with the pack of blanks in the machine, and, if under proper tension, will support the blanks which sustain the weight of the separator roll, against sagging, and thereby develop the full contemplated traction of the separator roll tending to discharge blanks from the pack receptacle.

When pull-out rolls 56 and 57 are mounted in association with the separator roll, the conveyor roller 18 may be installed in such close proximity to said pull-out rolls that the tapes 17 will guide the "leading" ends of separated blanks between said pull-out rolls, thus rendering other guides for the purpose unnecessary.

As in the feeders shown in Figs. 1 to 13, heretofore described, advancement of the pack of blanks in the pack receptacle D is effected by means of a ratchet gear applied to the conveyor mounted on the pack receptacle, the only differences being such as arise from the substitution for a continuous front conveyor roller 18, of a sectional roller mounted on the pins 129—to provide for contemplated adjustment of the caliper and retard member 89 which necessitates driving the conveyor from the conveyor roller 18' at the "loading" end of the pack receptacle, and, in the drawings, said conveyor is shown as being so driven, see particularly Figs. 16 to 19, inclusive.

As shown, in said figures, the conveyor is driven by means of a ratchet gear, which is operated and controlled by means practically identical with the driving and control means shown and described in the other embodiments of the invention, but which require certain adaptations which may be described briefly as follows:

For the intermittent feeder, these adaptations include, see Figs. 16, 17, and 18, lengthening of the link 50 which connects the rock-arm 26 with the pawl-carrying member 49 of the ratchet gear; and Connecting the cam disk 51 of the ratchet gear for actuating the conveyor with the pivoted counter-weighted control lever 23 by a bell-crank lever 134.

Also, for the continuous feeder, necessary adaptations include, see Fig. 19, aligning the rock-arm 116 with the lever 120 secured to the rock shaft 119; connecting both the link 117 which actuates the pawl-carrying arm 116 with the rock-arm 116; and the cam disk 51 of the ratchet gear with the counter-weighted control lever 23, by means of bell-crank levers designated, respectively, 135 and 136.

Within the scope and contemplation of the invention, a very effective feeder for use on relatively inexpensive paper handling machines designed and adapted for doing short jobs, and which may be either hand or power operated, can be produced by a simple adaptation of the blank separating and feeding devices per se, of my improved feeder, heretofore described, and I will now describe what I consider a preferable form of feeder embodying such adaptations, with particular reference to Figs. 20 to 22 of the drawings.

Excepting as regards the blank supporting means and the means for mounting the separator roll, said feeder is substantially similar to the same or corresponding features of the feeders heretofore described, and similar parts are designated by the same reference characters, and will readily be understood from an examination of the drawings without a further description thereof in any considerable detail.

Describing said feeder with reference to the drawings a designates the right hand side frame of the machine which, in its entirety, may be practically a duplicate of the frames of the feeders heretofore described, 19 designates the separator roll, the shaft 20 of which is rotatably mounted in fixed bearings in the plates 2 and 3 forming the upper parts of the side frames a, a', of the machine frame, G is the caliper device mounted on the bar 90 secured to lugs on the lower ends of arms 21, 21', pivoted on the shaft 20, said caliper member being similar in construction with that shown in other figures of the drawings and corresponding parts thereof, being designated by the same reference characters. Also, the caliper and retard member 89 is adjustable both circumferentially and radially, relative to the separator roll and is adapted to be secured in different adjusted positions by means of a rod 137 which extends through holes formed in the pivoted arms 21, 21', and also through slots 138 formed in the frame plates 2 and 3, concentric with the separator roll shaft 20, and is adapted to be secured in desired adjusted positions by clamping means consisting, as shown, of collars 139 secured to said rod at the inner sides of said frame plates, and thumb nuts 140, threaded to the ends of said rod which project through the slots 138.

The pack of blanks C to be separated and fed, is supported on a plate 141 mounted in inclined position, as shown, at the receiving side of the separator roll 19, so as to be bodily movable with the caliper device G mounted on the bar 90, the end of said plate 141 proximate the separator roll being pivoted to studs secured in the pivoted arms 21, 21', which engage bearings formed in the depending flanges of angular brackets 142 secured to the under side of said plate adjacent the edges thereof.

As shown, also, the end of said plate 141 remote from said separator roll, rests on a rod 143, secured to fixed arms on the frame plates 2 and 3, so as to be freely movable relative to the separator roll 19, the relation being such that the "leading" ends of the blanks, as they pass off from the end of said plate—excepting the foremost blank—which is in substantial alignment with the space between the separator roll and caliper and retard member 89, will contact with said caliper and retard member.

Also, said feeder may comprise pull-out rolls 56 and 57 mounted at the delivery side of the separator roll 19. As shown, said separator and pull-out rolls are designed to be driven continuously, the separator roll by a belt 144 adjusted to a pulley secured to the shaft 20 and with a source of power, assumed to be a driven member 10 of a primary machine, in association with which said feeder is mounted; the lower pull-out roll, by a belt adjusted to pulleys secured to the shaft thereof and to the separator roll shaft; and the upper pull-out rolls 57, which is freely rotatable on a rod 68 secured in bearings in arms 69, pinned or otherwise secured to a rock-shaft 70, by contact with the lower pull-out roll, being held yieldingly in contact therewith by springs 71 which connect the arms 69 with rigid parts of the machine frame, as shown.

Blanks discharged from the pack receptacle by the separator roll are guided between the pull-out rolls by fingers pivoted to and transversely adjustable on a rod 146, the ends of which are secured in the side plates 2 and 3 of the machine frame, and the free ends of said fingers rest upon and are slidably supported by a rod 147, the ends of which are secured in the depending flanges of the brackets 143 secured to the under side of the blank supporting plate 141, in position to avoid interference with the arms 21, 21' and also with the caliper and retard member 89.

While, as shown, said feeder is designed for continuous operation, it can, in view of preceding disclosures and descriptions, readily be adapted for intermittent operation without the exercise of invention. Attention is called to the fact that, within the scope and contemplation of the invention which forms the subject-matter of the present application, feeders embodying said invention, of the general type shown in Figs. 1 to 19, the pack advancing means of which is power-actuated, may readily be converted to render said power-actuated pack advancing means inactive and to provide for advancing the blanks in the pack receptacle into operative engagement with the separator and caliper and retard members and for maintaining them in such engagement, by gravity, substantially as shown in Figs. 20 and 21 of the drawings and as explained in the portion of the specification relating thereto, without structural changes and involving only a few simple adjustments and adaptations, as follows:

1. By means of the nut 55 threaded to the end of the link 53, which extends through the eye in and projects above the stud 54 pivoted to the counter-weighted lever 23, turn the cam disk 51 so that the stud 52 will ride upon the full-size sector of said cam disk in all pivotal operating positions of the rock-arm 26, thus preventing engagement of the pawl 48 with the teeth of the ratchet wheel 47, and thereby rendering the ratchet gear E and the pack advancing means on the pack receptacle D inactive;

2. Adjust the pack receptacle D pivotally so that the pack supporting surface thereof will decline at a proper angle towards the upper portion of the caliper and retard member, with the pack of blanks resting directly on the conveyor tapes; or 3. Move the conveyor tapes to the side to permit the pack of blanks to rest directly upon the pack supporting surface of the pack receptacle.

I claim:

1. In a machine for separating and feeding blanks, the combination of a frame, a pack receptacle comprising a surface for supporting a pack of fanned blanks, means for advancing the pack, blank separating means comprising a separator member supported in position to engage a blank in position to be fed, a combined caliper and retard member mounted in association with said separator member, said members having capacity for relative adjustment to effect alignment of the space between said members relative to a blank in position to be fed.

2. In a machine for separating and feeding blanks, the combination of a frame, a pack receptacle comprising a surface for supporting a pack of fanned blanks, means for advancing the pack, blank separating means comprising a separator member movably supported in position to engage a blank in position to be fed, a combined caliper and retard member mounted in association with and in spaced relation to said separator member with capacity for adjustment relative thereto both radially and circumferentially, and means for securing said caliper and retard member in adjusted positions.

3. In a machine for separating and feeding blanks, the combination of a frame, an adjustable pack receptacle for supporting a pack of fanned blanks, blank separating means comprising a separator member supported above and freely movable toward and from the pack supporting surface of the pack receptacle in position to engage a blank in position to be fed, a combined caliper and retard member mounted in adjustable spaced relation to said separator member and bodily movable therewith, means for securing said pack receptacle in various inclined positions, the blanks being maintained in fanned feeding position thereon by gravity, and means for actuating the separator member to feed blanks.

4. In a machine for separating and feeding blanks, the combination of a frame, a pack receptacle comprising a surface for supporting a pack of fanned blanks, blank separating means comprising a separator member supported above and movable towards and from the pack supporting surface of the pack receptacle in position to engage a blank in position to be fed, a combined caliper and retard member mounted in association with and in spaced relation to said separator member with capacity for relative circumferential adjustment of said members to substantially align the space between said members with a blank in position to be fed.

5. The machine specified in claim 1, in which the pack receptacle is pivotally supported closely adjacent to its discharge end, and which comprises means for securing said pack receptacle in different adjusted positions.

6. The machine specified in claim 1, in which the caliper and retard member is adjustable towards and from the separator member.

7. The machine specified in claim 1, in which the separator member is counter-balanced.

8. The machine specified in claim 1, in which the separator member is a roll and the caliper and retard member is circumferentially adjustable relative thereto to effect alignment of the space between the separator member and the caliper and retard member with a blank in position to be fed.

9. The machine specified in claim 1, in which the pack receptacle is pivotally supported at its discharge end, and the caliper and retard member is adjustable towards and from the separator member.

10. The machine specified in claim 1, in which the pack receptacle is pivotally supported at its discharge end, and in which, also, the separator member is a roll, and the caliper and retard member is circumferentially adjustable relative thereto.

11. The machine specified in claim 1, in which the pack receptacle is pivotally supported at its discharge end, and in which, also, the separator member is a roll and the caliper and retard member is adjustable relative thereto both radially and circumferentially.

12. In a machine for separating and feeding blanks, the combination of a frame, a pack receptacle comprising a bottom plate which forms the blank supporting surface of the pack receptacle arranged to support a pack of fanned blanks, blank separating means comprising a separator member supported above and movable towards and from said blank supporting surface, a combined caliper and retard member mounted in spaced relation to said separator member and bodily movable therewith, means for actuating said separator member to feed blanks, means for advancing blanks in the pack receptacle to the blank separator member, and means for controlling actuation of said pack advancing means rendered operative by movement of the separator member, towards and from the blank supporting surface of the pack receptacle.

13. In a machine for separating and feeding blanks, the combination of a frame, a pack receptacle comprising a bottom plate which forms the blank supporting surface of said pack receptacle, arranged to support a pack of fanned blanks, blank separating means comprising a separator member supported above and movable towards and from said blank supporting surface, a combined caliper and retard member mounted in spaced relation to said separator member and bodily movable therewith, means for actuating said separator member to feed blanks, means for advancing blanks in the pack receptacle to the blank separator member, and means for rendering the pack advancing means inactive rendered operative by movement of the separator member away from the blank supporting surface of the pack receptacle.

14. The machine specified in claim 12, which also comprises manually operable means for rendering the pack advancing means inactive in whole or in part.

15. The machine specified in claim 12, in which the pack advancing means is a conveyor comprising rollers rotatably mounted in spaced relation lengthwise of the pack receptacle, tapes adjusted to said rollers, and power means for actuating said conveyor applied to a supporting roller thereof.

16. The machine specified in claim 12, in which the pack advancing means is a conveyor comprising rollers rotatably mounted in spaced relation lengthwise of the pack receptacle, tapes adjusted to said rollers, and power means for actuating said conveyor applied to a supporting roller thereof, comprising a ratchet gear.

17. The machine specified in claim 12, in which the pack advancing means is a conveyor comprising rollers rotatably mounted in spaced relation lengthwise of the pack receptacle, tapes adjusted to said rollers, and power means for actuating said conveyor applied to a supporting roller thereof, comprising a ratchet gear and means controlled by movement of the separator member towards and from the blank supporting surface of the pack receptacle for effecting engagement and disengagement respectively of the pawl with and from the teeth of the ratchet wheel.

18. The machine specified in claim 12, in which the means for supporting the separator member, comprises a rock-shaft, arms secured thereto on which said separator member is supported directly and a counter-balanced lever secured to said rock-shaft, and the pack advancing means comprises a conveyor mounted on the pack receptacle, power means for actuating said conveyor comprising a ratchet gear applied to a supporting roller of said conveyor, and means controlled by movement of the separator member towards and from the blank supporting surface of the pack receptacle for rendering said ratchet gear inactive.

19. The machine specified in claim 12, in which the means for supporting the separator member, comprises a rock-shaft, arms secured thereto on which said separator member is supported, and a counter-balanced lever secured to said rock-shaft, and the pack advancing means comprises a conveyor mounted on the pack receptacle, power means for actuating said conveyor comprising a ratchet gear applied to a supporting roller of said conveyor, and means for rendering the pack advancing means inactive, comprising a cam plate rotatably mounted adjacent the ratchet wheel of the ratchet gear, a stud on the ratchet pawl which extends over said cam plate and a link which connects the counter-balanced lever applied to the separator member and said cam plate eccentric to their respective axes of rotation, whereby pivotal movement of said lever will impart turning movement to said cam plate, said cam plate comprising sectors of different radial dimensions contact of the stud on the ratchet pawl with one of which will permit said pawl to engage the teeth of the ratchet wheel and with the other sector will cause said pawl to idle.

20. The machine specified in claim 12, in which the means for supporting the separator member, comprises a rock-shaft, arms secured thereto on which said separator member is supported directly, and a counter-balanced lever secured to said rock-shaft, and the pack advancing means comprises a conveyor mounted on the pack receptacle, power means for actuating said conveyor comprising a ratchet gear applied to a supporting roller of said conveyor, and means for rendering the pack advancing means inactive, comprising a cam plate rotatably mounted adjacent the ratchet wheel of the ratchet gear, a stud on the pawl of the ratchet gear which extends over said cam plate, a link which connects the counter-balanced lever applied to the separator member and said cam plate eccentric to their respective axes of rotation, and relation being such that pivotal movement of said lever will impart turning movement to said cam plate, said cam plate comprises sectors of different radial dimensions contact of the stud on said ratchet pawl with one of which will permit said pawl to engage the teeth of the ratchet wheel and with the other will prevent such engagement.

21. The machine specified in claim 12, in which the means for supporting the separator member, comprises a rock-shaft, arms secured thereto on which said separator member is supported directly, and a counter-balanced lever secured to said rock-shaft, and the pack advancing means comprises a conveyor mounted on the pack receptacle, power means for actuating said conveyor comprising a ratchet gear applied to a supporting roller of said conveyor, and means for rendering the pack advancing means inactive, comprising a cam plate rotatably mounted adjacent the ratchet wheel of the ratchet gear, a stud on the pawl of the ratchet gear which extends over said cam plate, a link which connects the counter-balanced lever applied to the separator member and said cam plate eccentric to their respective axes of rotation, the relation being such that pivotal movement of said lever will impart turning movement to said cam plate, said cam plate comprising sectors of different radial dimensions contact of the stud on said ratchet pawl with one of which will permit said pawl to engage the teeth of the ratchet wheel and with the other will prevent such engagement, and manually adjustable means for varying the operative length of the link which connects said counter-balanced lever and cam plate to vary the travel of the pack advancing means.

22. The machine specified in claim 12, in which the means for supporting the separator member, comprises a rock-shaft, arms secured thereto on which said separator member is supported directly, and a counter-balanced lever secured to said rock-shaft and the pack advancing means comprises a conveyor mounted on the pack receptacle, power means for actuating said conveyor comprising a ratchet gear applied to a supporting roller of said conveyor, and means for rendering the pack advancing means inactive, comprising a cam plate rotatably mounted adjacent the ratchet wheel of the ratchet gear a stud on the pawl of the ratchet gear which extends over said cam plate, a link which connects the counter-balanced lever applied to the separator member and said cam plate eccentric to their respective axes of rotation, the relation being such that pivotal movement of said lever will impart turning movement to said cam plate, said cam plate comprising sectors of different radial dimensions contact of the stud on said ratchet pawl with one of which will permit said pawl to engage the teeth of the ratchet wheel and with the other will prevent such engagement, and manually adjustable means for varying the operative length of the link which connects said counter-balanced lever and cam plate to render said pack advancing means inactive in whole or in part.

23. The machine specified in claim 12, in which the separator member is a roll and the means for mounting and actuating the same comprises a counter-balanced rock-shaft, arms secured thereto provided with bearings, a shaft rotatably mounted in said bearings to which said separator roll is secured, a driven member rotatably mounted on the machine frame, and a gear train connecting said driven member and separator roll shaft, comprising gears secured thereto, respectively, and an intermediate gear rotatably mounted on an arm secured to the rock-shaft in which said separator roll shaft has a bearing, which intermeshes with the gears secured to said driven member and separator roll shaft.

24. The machine specified in claim 12, in which the separator member is a roll and the means for mounting said separator roll comprises a counter-balanced rock-shaft, arms secured thereto, a shaft rotatably mounted in bearings in said arms to which the separator roll is secured, plates mounted on said shaft so as to be angularly adjustable thereon, arms on said plates proportioned to extend below the separator member, means for securing said plates in position on said shaft corresponding to desired angular adjustment of the arms thereon, and a transverse bar secured to said arms on which the caliper and retard member is mounted.

25. The machine specified in claim 12, in which the separator member is a roll and the means for mounting said separator roll and the caliper and retard member comprises a counter-balanced rock-shaft, arms secured thereto, a shaft rotatably mounted in said arms to which the separator roll is secured, plates mounted on said shaft so as to be angularly adjustable thereon, arms on said plates proportioned to extend below the separator member, means for securing said plates in position on the separator roll shaft corresponding to desired angular adjustment of the arms thereon, and a transverse bar secured to said arms on which the caliper and retard member is supported so as to be adjustable transversely of the machine.

26. The machine specified in claim 12, in which the separator member is a roll and the means for mounting said separator roll and the caliper and retard member comprises a counter-balanced rock-shaft, arms secured thereto, a shaft rotatably mounted in bearings in said arms to which the separator roll is secured, plates mounted on said shaft so as to be angularly adjustable thereon, arms on said plates, means for securing said plates in position on said shaft corresponding to desired angular adjustment of the arms thereon, comprising segmental slots formed in said adjustable plates concentric with the shaft of the separator roll, and clamping screws which extend through said slots and have threaded engagement with holes in said rock-arms and a transverse bar secured to said arms on which the caliper and retard member is supported.

27. The machine specified in claim 12, in which the separator member is a roll, and the means for mounting said separator roll and the caliper and retard member comprises a counter-balanced rock-shaft, arms secured thereto, a shaft rotatably mounted in bearings formed in said arms, to which the separator roll is secured, said rock-arms comprising downward extensions, a transverse bar secured to said rock-arms, a block secured to said bar, a yoke comprising a shank fitted to a bearing in said block arranged to permit adjustment of said yoke towards and from said separator roll and spaced bearing lugs thereon between which said caliper and retard member is mounted, and an adjusting screw threaded into the end of said block remote from the separator roll, a collar on said screw provided with an annular groove, and a plate secured to the shank of the yoke on which the caliper and retard member is mounted provided with forked projections arranged to interlock with the annular groove in the collar on said adjusting screw.

28. In a machine for separating and feeding blanks, the combination of a frame, a pack receptacle, blank separating means comprising a separator member supported above and movable towards and from the blank supporting surface of the pack receptacle, means for actuating said separator member to feed blanks, comprising a rack-bar, a rock-arm to which one end of said rack-bar is connected, means for oscillating said rock-arm, relatively movable pull-out rolls mounted in association with the blank separator member in position to receive separated blanks therefrom, means for maintaining said pull-out rolls yieldingly in contact, means rendered operative by oscillation of the rock-arm for actuating the separator member to alternately separate and release said pull-out rolls in timed relation with actuation of the blank separator member, and means for rotating said rolls.

29. In a machine for separating and feeding blanks, the combination of a frame, a pack receptacle, blank separating means comprising a separator member supported above and movable towards and from the blank supported surface of the pack receptacle, means for actuating said separator member to feed blanks, comprising a rack-bar, a rock-arm to which one end of said rack-bar is connected, means for oscillating said rock-arm, relatively movable pull-out rolls mounted in association with the blank separating means in position to receive separated blanks therefrom, means for maintaining said pull-out rolls yieldingly in contact, means rendered operative by oscillation of the rock-arm for actuating the separator member to alternately separate and release said pull-out rolls in timed relation with actuation of the separator member, and means for rotating said rolls applied to one thereof.

30. In a machine for separating and feeding blanks, the combination of a frame, a pack receptacle, a blank separator member supported above and movable towards and from the blank supporting surface of the pack receptacle, means for actuating said member comprising a rock-arm, pull-out rolls mounted in position to receive separated blanks from the separator member, a yieldingly supported rod on which one of said pull-out rolls is mounted arranged to maintain said roll yieldingly in contact with the cooperating pull-out roll and means rendered operative by oscillation of the rock-arm for actuating the separator member for imparting movement to said rod together with the pull-out roll mounted thereon to effect separation of the pull-out rolls and to then release said rod and roll whereupon contact of said pull-out rolls will be restored.

31. The machine specified in claim 28, in which the means for imparting movement to said yieldingly supported pull-out roll to raise the same from contact with the other roll and to release said yieldingly supported roll, comprising an arm pivoted adjacent the rock-arm for actuating the separator member, cooperating cam surfaces formed on the end of said pivoted arm and on said yieldingly supported rod, arranged to effect separation of the roll mounted on said rod from the cooperating pull-out roll when said rock-arm is turned pivotally to actuate the separator member to feed a blank, and to transfer said rod to a supporting surface formed on the end of said arm continuous with the upper end of the cam surface thereon, and pivotal movement of said arm produced by retraction of said rock-arm operating to effect disengagement of said rod from the supporting surface on said pivoted arm and to thereby restore contact of said pull-out rolls.

32. In a machine for separating and feeding blanks, the combination of a frame, a pack receptacle, a blank separator member, means for actuating said member to feed blanks comprising a rock-arm, pull-out rolls mounted in position to receive separated blanks from the separator member, comprising a roll rotatable on a fixed axis and a roll mounted on a yieldingly supported rod arranged to maintain the roll mounted thereon yieldingly in contact with the cooperating pull-out roll, and means rendered operative by oscillation of the rock-arm for actuating the separator member for imparting movement to said rod together with the roll thereon to effect separation of the pull-out rolls and to then release said rod and roll, whereupon contact of said pull-out rolls will be restored, said means comprising an arm pivoted adjacent the rock-arm for actuating the separator member, and means rendered operative by oscillation of said rock-arm for turning said arm pivotally, comprising a stud secured therein and spaced projections on said rock-arm between which said stud is positioned, the relation being such that the distance between said projections will exceed the corresponding dimensions of said stud thereby providing for lost motion of said rock-arm relative to said pivoted arm.

33. In a machine for separating and feeding blanks, the combination of a frame, a pack receptacle, a blank separator member, means for actuating said member to feed blanks comprising a rock-arm, pull-out rolls mounted in position to receive separated blanks from the separator member, comprising a roll rotatable on a fixed axis and a roll mounted on a yieldingly supported rod, arranged to maintain the roll mounted thereon yieldingly in contact with the cooperating pull-out roll and means rendered operative by oscillation of the rock-arm for actuating the separator member to impart movement to said rod together with the roll thereon to separate the pull-out rolls and to then release said rod and roll, whereupon contact of said pull-out rolls will be restored, said means comprising an arm pivoted adjacent the rock-arm for actuating the separator member and means rendered operative by oscillation of said rock-arm for turning said arm pivotally, comprising a stud secured therein, and adjustable spaced projections on said rock-arm between which said stud is positioned, the relation being such that the distance between said projections will exceed the dimensions of the stud secured in said pivoted arm, thereby providing for lost motion of said rock-arm relative to said pivoted arm.

34. In a machine for separating and feeding blanks, the combination of a frame, a pack receptacle supported thereon comprising a bottom plate, blank separating means comprising a separator member supported above and movable towards and from said bottom plate, a combined caliper and retard member mounted in spaced relation to and bodily movable with said separator member, means for actuating said separator member to feed blanks, means for adjustably supporting said caliper and retard member to vary alignment of the space between said member and the separator member with a blank in position to be fed, means for advancing blanks in the pack receptacle to the separator member consisting of rollers rotatably mounted on the pack receptacle in spaced relation lengthwise thereof, said rollers comprising a driven roller at the "loading" end of said receptacle, and a roller comprising relatively short sections, axially, rotatably mounted in transverse spaced relation at the discharge end of the pack receptacle, and tapes adjusted to said rollers, the bottom plate of the pack receptacle being proportioned to provide for contemplated adjustment of the caliper and retard member relative to the separator member.

35. The machine specified in claim 34, in which the sections of the conveyor roller at the discharge end of the pack receptacle are mounted on members secured to the bottom plate of the pack receptacle and which project therefrom towards the discharge end of the machine.

36. The machine specified in claim 34, in which the sections of the conveyor roller at the discharge end of the pack receptacle are mounted on members secured to the bottom plate of the pack receptacle and which project therefrom towards the discharge end of the machine, the relation being such that the axis of rotation of said sectional conveyor roller will be at the discharge side of a vertical plane through the axis of rotation of the separator roll, whereby the conveyor tapes will provide a support for the "leading" ends of fed blanks on both sides of the point of contact of the separator roll therewith.

37. The machine specified in claim 34, in which the sections of the conveyor roller at the discharge end of the pack receptacle are mounted between the flanges of channels secured to the bottom plate of the pack receptacle, the webs of which are cut-a-way to receive said roller sections.

38. The machine specified in claim 34, in which the sections of the conveyor roller at the discharge end of the pack receptacle are mounted between the flanges of channels secured to the bottom plate of the pack receptacle, the webs of said channels being cut-a-way to receive said roller sections and the flanges thereof comprising portions adjacent their ends proportioned to embrace and guide the conveyor tapes.

39. The machine specified in claim 34, which also, comprises means for pivotally supporting the discharge end of the pack receptacle, comprising studs on the side frames of the machine and downwardly projecting plates on the pack receptacle provided with bearings fitted to the studs on the machine frame.

40. The machine specified in claim 34, which, also, comprises means for pivotally supporting the discharge end of the pack receptacle, comprising studs on the side frames of the machine and downwardly projecting plates on the pack receptacle provided with bearings fitted to the studs on the machine frame, the relation being such that the pack receptacle pivots are in substantial alignment with the axis of rotation of the sectional roller for pivotally mounting the pack receptacle.

41. In a machine for separating and feeding blanks, the combination of a frame, blank supporting means, blank separating and feeding means comprising a separator member, means for actuating said separator member to feed blanks, and a combined caliper and retard member mounted in association with and in spaced relation to said separator member and means for effecting relative circumferential adjustment of said members.

42. In a machine for separating and feeding blanks, the combination of a frame, blank supporting means, blank separating and feeding means comprising a separator member, means for actuating said separator member to feed blanks, and a combined caliper and retard member mounted in association with and in spaced relation to said separator member and circumferentially and radially adjustable relative thereto.

43. The machine specified in claim 42, in which the blank supporting means comprises a plate which declines towards the blank separating and feeding member.

44. In a machine for separating and feeding blanks, the combination of a frame, blank supporting means, a separator roll, means for rotatably mounting said roll comprising a shaft to which said roll is secured, means for actuating said roll to feed blanks, a combined caliper and retard member, means for mounting said member comprising arms pivoted to the separator roll shaft, a bar secured to said arms on which said caliper and retard member is mounted, and means for securing said arms in different adjusted positions to effect alignment of the space between the separator roll and the caliper and retard member with a blank in position to be fed.

45. The machine specified in claim 44, in which the caliper and retard member is adjustable towards and from the separator member.

46. The machine specified in claim 44, in which the caliper and retard member is adjustable relative to the separator roll both radially and circumferentially, and which comprises means for securing said caliper and retard member in adjusted positions.

47. The machine specified in claim 44, in which the caliper and retard member is provided with a bearing adjustably fitted to a transverse rod, the ends of which are secured to the pivoted arms which support said member, and the blank supporting means comprises a bottom plate on which the blanks rest in operation, the end of which proximate the separator roll is pivoted to the shaft secured in the pivoted arms which support the caliper and retard member, and which at a point remote from its pivot slidably rests on a rod secured in arms on the machine frame.

48. The machine specified in claim 44, in which the means for securing the arms pivoted to the separator roll shaft in adjusted positions consists of a rod secured to said pivoted arms, the ends of which project through segmental slots formed in the side frames of the machine concentric with the axis of rotation of the separator roll, and clamping nuts threaded to the projecting ends of said rods arranged to frictionally engage said side frames.

49. The machine specified in claim 44, which also comprises pull-out rolls mounted in association with the separator roll in position to receive separated blanks therefrom, and means for guiding said separated blanks from said separator roll to said pull-out rolls.

50. The machine specified in claim 44, which also comprises pull-out rolls mounted in association with the separator roll in position to receive separated blanks therefrom, and means for guiding said separated blanks from said separator roll to said pull-out rolls, comprising a transverse rod secured in the side frames of the machine at the receiving side of the pull-out rolls and in proximate relation thereto, fingers pivoted to said rod which extend beneath the separator roll, the free ends of which rest slidably on a rod secured in the bearing brackets for pivotally connecting the blank supporting plate to the pivoted arms by which the caliper and retard member is supported.

51. The machine specified in claim 1, in which the "loading" end of the pack receptacle is unobstructed so that as blanks are withdrawn from the pack receptacle in operation, the supply of blanks may be replenished by inserting additional blanks fanned out end-wise directly beneath the "following" end of the pack.

52. The machine specified in claim 12, in which the means for mounting the separator member comprises a counter-balanced rock-shaft, and downwardly inclined arms secured thereto on which said separator member is supported, the relation being such that advancement of a blank in contact with the separator member will exert a component of force thereon to raise said member.

53. In a machine for separating and feeding blanks, the combination of a frame, a pack receptacle adjustably supported thereon comprising a surface for supporting a pack of fanned blanks, blank separating means comprising a separator member supported above and freely movable towards and from the pack supporting surface of the pack receptacle and arranged to engage blanks in position to be fed, a combined caliper and retard member adjustably mounted in association with and in spaced relation to said separator member and bodily movable therewith, means for adjusting said caliper and retard member towards and from said separator member to vary the width of the space between said members, means for securing said pack receptacle in different angular adjustments, means for supporting and guiding the leading edges of a blank or blanks in the pack receptacle into contact with the surface of the caliper and retard member and with the blank next to be fed in contemplated operative alignment with the space between said separator and caliper and retard members, the blanks being freely advanced into operative engagement with the separator and caliper and retard members and maintained in a state of substantial repose in fanned feeding position by gravity, and means for actuating the separator member to feed blanks.

54. The machine specified in claim 1, which also comprises pull-out rollers rotatably mounted in spaced relation to the separator member in position to receive separated blanks therefrom.

WILLIAM WARD DAVIDSON.